US012548658B2

(12) United States Patent
Saggar et al.

(10) Patent No.: US 12,548,658 B2
(45) Date of Patent: Feb. 10, 2026

(54) SYSTEMS AND METHODS FOR SCALABLE MAPPING OF BRAIN DYNAMICS

(71) Applicant: The Board of Trustees of the Leland Stanford Junior University, Stanford, CA (US)

(72) Inventors: Manish Saggar, Stanford, CA (US); Samir Chowdhury, Stanford, CA (US); Caleb Geniesse, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 650 days.

(21) Appl. No.: 18/045,772

(22) Filed: Oct. 11, 2022

(65) Prior Publication Data

US 2023/0112375 A1  Apr. 13, 2023

Related U.S. Application Data

(60) Provisional application No. 63/254,026, filed on Oct. 8, 2021.

(51) Int. Cl.
*G16H 30/20* (2018.01)
*A61B 5/00* (2006.01)
(Continued)

(52) U.S. Cl.
CPC ............. *G16H 30/20* (2018.01); *A61B 5/165* (2013.01); *A61B 5/4064* (2013.01);
(Continued)

(58) Field of Classification Search
CPC ........ G16H 30/20; G16H 30/40; G16H 50/20; G16H 20/70; G16H 50/50; A61B 5/0042;
(Continued)

(56) References Cited

U.S. PATENT DOCUMENTS

| 11,330,730 B2 | 5/2022 | Tramet et al. |
| 11,333,730 B2 | 5/2022 | Saggar |

(Continued)

FOREIGN PATENT DOCUMENTS

| WO | 2019084327 A1 | 5/2019 | |
| WO | WO-2020244734 A1 * | 12/2020 | ........... G06V 10/426 |

OTHER PUBLICATIONS

Geniesse, Caleb, et al. "Generating dynamical neuroimaging spatiotemporal representations (DyNeuSR) using topological data analysis." Network neuroscience 3.3 (2019): 763-778. (Year: 2019).*

(Continued)

*Primary Examiner* — Sumati Lefkowitz
*Assistant Examiner* — Ryan P Potts
(74) *Attorney, Agent, or Firm* — KPPB LLP

(57) ABSTRACT

Systems and methods for scalable mapping of brain dynamics are capable of mapping brain dynamics in a computationally efficient way. Shape graphs can be produced which can operate as interactive network representations of dynamic brain activity data. In methods for automatically interpreting the structure of the shape graphs, the mapped brain dynamics can be used to indicate which type of treatment protocol is likely to be most effective for the particular individual. The treatment can include transcranial magnetic stimulation, pharmaceutical treatment, and/or any other mental condition treatment as appropriate to the requirements of specific applications.

5 Claims, 15 Drawing Sheets
(10 of 15 Drawing Sheet(s) Filed in Color)

(51) Int. Cl.
  A61B 5/16      (2006.01)
  G06F 18/2323   (2023.01)
  G06T 7/00      (2017.01)
  G16H 50/20     (2018.01)

(52) U.S. Cl.
  CPC ........ *G06F 18/2323* (2023.01); *G06T 7/0012* (2013.01); *G16H 50/20* (2018.01); *G06T 2207/30016* (2013.01)

(58) Field of Classification Search
  CPC ............... A61B 5/055; A61B 2576/00; A61B 2576/026; A61B 6/501; A61B 2090/374; A61B 5/165; A61B 2090/3937; A61B 2090/3954; A61B 5/4064; A61B 6/03; A61B 6/032; A61B 6/5229; A61B 5/00; A61B 5/16; G06T 2207/10088; G06T 2207/30016; G06T 7/0012; G06T 2207/10081; G06T 7/97; G06T 2207/30004; G06T 2210/41; G06T 2219/004; G06T 7/00; G06N 20/00; G06N 3/02; G06N 3/088; G01R 33/4806; G01R 33/5608; G01T 1/161; G06V 10/7715; G06V 10/40; G06V 2201/03; G06F 18/2323

See application file for complete search history.

(56) References Cited

U.S. PATENT DOCUMENTS

| | | | |
|---|---|---|---|
| 11,693,071 | B2 | 7/2023 | Saggar |
| 2002/0042563 | A1 | 4/2002 | Becerra et al. |
| 2002/0058867 | A1 | 5/2002 | Breiter et al. |
| 2005/0134587 | A1 | 6/2005 | Geiger et al. |
| 2013/0113816 | A1 | 5/2013 | Sudarsky et al. |
| 2016/0350389 | A1 | 12/2016 | Kloke et al. |
| 2019/0120919 | A1 | 4/2019 | Saggar |
| 2021/0327108 | A1* | 10/2021 | Kumari ................... G06F 17/11 |
| 2022/0230752 | A1* | 7/2022 | Butz-Ostendorf ..... G16H 50/50 |
| 2022/0365157 | A1 | 11/2022 | Saggar |

OTHER PUBLICATIONS

Yamin, A., et al. "Analysis of dynamic brain connectivity through geodesic clustering." Image Analysis and Processing—ICIAP 2019: 20th International Conference, Trento, Italy, Sep. 9-13, 2019, Proceedings, Part II 20. Springer International Publishing, 2019. (Year: 2019).*

Pedronette, Daniel Carlos Guimaraes, Otávio AB Penatti, and Ricardo da S. Torres. "Unsupervised manifold learning using reciprocal knn graphs in image re-ranking and rank aggregation tasks." Image and Vision Computing 32.2 (2014): 120-130. (Year: 2014).*

Iivanainen, Joonas, et al. "Sampling theory for spatial field sensing: Application to electro- and magnetoencephalography." arXiv preprint arXiv:1912.05401 (2019). (Year: 2019).*

Yamin, Muhammad Abubakar, et al. "Encoding brain networks through geodesic clustering of functional connectivity for multiple sclerosis classification." 2020 25th International Conference on Pattern Recognition (ICPR). IEEE, 2021. (Year: 2021).*

International Preliminary Report on Patentability for International Application PCT/US2018/057595, Report issued Apr. 28, 2020, Mailed May 7, 2020, 8 pgs.

International Search Report and Written Opinion for International Application No. PCT/US2018/057595, Search completed Dec. 11, 2018, Mailed Dec. 31, 2018, 23 pgs.

The Virtual Brain, Retrieved from: https://www.thevirtualbrain.org, Printed Jan. 25, 2019, 1 pg.

"Welcome to C-PAC's Documentation", Retrieved from: https://web.archive.org/web/20160503042759/http://fcp-indi.github.io/docs/user/index.html, C-PAC 0.3.9 Alpha, Captured May 3, 2016, 2 pgs.

Abdi et al., "Metric Multidimensional Scaling (MDS): Analyzing Distance Matrices", Neil Salkind (Ed.) Encyclopedia of Measurement and Statistics, 2007, 13 pgs.

Agrawal et al., "Automatic subspace clustering of high dimensional data", Data Mining and Knowledge Discovery, 2005, 12 pgs.

Allen et al., "Tracking Whole-Brain Connectivity Dynamics in the Resting State", Cerebral Cortex, vol. 24, No. 3, Mar. 1, 2014, Electronic Publication: Nov. 11, 2012, pp. 663-676.

Barch et al., "Function in the human connectome: Task-fMRI and individual differences in behavior", NeuroImage, vol. 80, 2013, pp. 169-189.

Bassett et al., "Dynamic reconfiguration of human brain networks during learning", Proceedings of the National Academy of Sciences of the United States of America, vol. 108, No. 18, May 3, 2011, pp. 7641-7646, doi: 10.1073/pnas.1018985108.

Bassett et al., "Task-Based Core-Periphery Organization of Human Brain Dynamics", PLoS Computational Biology, vol. 9, No. 9, Sep. 26, 2013, e1003171, 16 pgs.

Behzadi et al., "A component based noise correction method (CompCor) for BOLD and perfusion based fMRI", NeuroImage, vol. 37, No. 1, Aug. 1, 2007, Electronic Publication: May 3, 2007, pp. 90-101.

Berman et al., "Depression, rumination and the default network", Social Cognitive and Affective Neuroscience, vol. 6, No. 5, Oct. 2011, Electronic Publication: Sep. 19, 2010, pp. 548-555.

Borgatti et al., "Models of core/periphery structures", Social Networks, vol. 21, No. 4, 1999, pp. 375-395.

Bullmore et al., "Complex brain networks: graph theoretical analysis of structural and functional systems", Reviews, vol. 10, Mar. 2009, pp. 186-198.

Calhoun et al., "The Chronnectome: Time-Varying Connectivity Networks as the Next Frontier in fMRI Data Discovery", Neuron, vol. 84, Oct. 22, 2014, pp. 262-274.

Carlsson, "Topological pattern recognition for point cloud data", Acta Numerica, vol. 23, May 12, 2014, pp. 289-368.

Chang et al., "EEG correlates of time-varying BOLD functional connectivity", NeuroImage, vol. 72, May 15, 2013, Electronic Publication: Jan. 31, 2013, pp. 227-236.

Chang et al., "Time-frequency dynamics of resting-state brain connectivity measured with fMRI", NeuroImage, vol. 50, No. 1, Mar. 2010, pp. 81-98.

Chowdhury et al., "Generalized Spectral Clustering via Gromov-Wasserstein Learning", International Conference on Artificial Intelligence and Statistics, Jun. 2020, 15 pgs.

Cohen, "The behavioral and cognitive relevance of time-varying, dynamic changes in functional connectivity", NeuroImage, vol. 180, Part B, Oct. 15, 2018, pp. 515-525.

Cole et al., "Multi-task connectivity reveals flexible hubs for adaptive task control", Nature Neuroscience, vol. 16, No. 9, 2013, pp. 1348-1355.

Cole et al., "Prefrontal Dynamics Underlying Rapid Instructed Task Learning Reverse with Practice", The Journal of Neuroscience, vol. 30, No. 42, Oct. 20, 2010, pp. 14245-14254.

Cribben et al., "Dynamic connectivity regression: Determining state-related changes in brain connectivity", NeuroImage, vol. 61, No. 4, Jul. 16, 2012, pp. 907-920.

Cunningham et al., "Dimensionality reduction for large-scale neural recordings", Nature Neuroscience, vol. 17, No. 11, Aug. 24, 2014, pp. 1500-1509.

Dadi et al., "Benchmarking functional connectome-based predictive models for resting-state fMRI", NeuroImage, vol. 192, May 15, 2019, pp. 115-134, doi: 10.1016/j.neuroimage.2019.02.062.

Damaraju et al., "Dynamic functional connectivity analysis reveals transient states of dysconnectivity in schizophrenia", NeuroImage: Clinical, vol. 5, Jul. 24, 2014, pp. 298-308.

Damoiseaux et al., "Consistent resting-state networks across healthy subjects", PNAS, vol. 103, No. 37, Sep. 12, 2006, pp. 13848-13853.

Demirtas et al., "Dynamic Functional Connectivity Reveals Altered Variability in Functional Connectivity Among Patients With Major Depressive Disorder", Human Brain Mapping, vol. 37, No. 8, Apr. 28, 2016, pp. 2918-2930.

Dlotko et al., "Ball mapper: a shape summary for topological data analysis", ArXiv, Jan. 22, 2019, 18 pgs.

(56) References Cited

OTHER PUBLICATIONS

Duman et al., "Uncovering dynamic brain reconfiguration in MEG working memory n-back task using topological data analysis", Brain Sciences, vol. 9, No. 144, 2019, 15 pgs., doi:10.3390/brainsci9060144.

Evans et al., "Brain templates and atlases", NeuroImage, vol. 62, Issue 2, Aug. 15, 2012, pp. 911-922, doi: 10.1016/j.neuroimage.2012.01.024.

Fortunato, "Community detection in graphs", Physics Reports, vol. 486, No. 3-5, Feb. 2010, pp. 75-174.

Geniesse et al., "Generating dynamical neuroimaging spatiotemporal representations (DyNeuSR) using topological data analysis", Network Neuroscience, vol. 3, No. 3, 2019, pp. 1-33.

Geniesse et al., "NeuMapper: A scalable computational framework for multiscale exploration of the brain's dynamical organization", Network Neuroscience, vol. 6, No. 2, Jun. 1, 2022, pp. 467-498.

Glasser et al., "The Human Connectome Project's neuroimaging approach", Nature Neuroscience, vol. 19, No. 9, Aug. 26, 2016, pp. 1175-1187.

Glasser et al., "The minimal preprocessing pipelines for the Human Connectome Project", NeuroImage, vol. 80, 2013, available online May 11, 2013, pp. 105-124.

Gonzalez et al., "Clustering to minimize the maximum intercluster distance", Theoretical Computer Science, vol. 38, 1985, pp. 293-306.

Gonzalez-Castillo et al., "Task-based dynamic functional connectivity: Recent findings and open questions", NeuroImage, vol. 180, Part B, Oct. 15, 2018, pp. 526-533.

Gonzalez-Castillo et al., "Tracking ongoing cognition in individuals using brief, whole-brain functional connectivity patterns", Proceedings of the National Academy of Sciences, vol. 112, No. 28, Jul. 14, 2015, pp. 8762-8767.

Gordon et al., "Precision Functional Mapping of Individual Human Brains", Neuron, vol. 95, 2017, pp. 791-807, doi: 10.1016/j.neuron.2017.07.011.

Grabner et al., "Symmetric Atlasing and Model Based Segmentation: An Application to the Hippocampus in Older Adults", International Conference on Medical Image Computing and Computer-Assisted Intervention, LNCS, vol. 4191, MICCAI 2006, 2006, pp. 58-66.

Handwerker et al., "Periodic changes in fMRI connectivity", NeuroImage, vol. 63, No. 3, Nov. 15, 2012, pp. 1712-1719.

Hinton et al., "Stochastic Neighbor Embedding", Proceedings of the 15th International Conference on Neural Information Processing Systems, 2002, pp. 857-864.

Hutchison et al., "Dynamic functional connectivity: Promise, issues, and interpretations", NeuroImage, vol. 80, Oct. 15, 2013, pp. 360-378.

Hutchison et al., "Resting-State Networks Show Dynamic Functional Connectivity in Awake Humans and Anesthetized Macaques", Human Brain Mapping, vol. 34, No. 9, Sep. 2013, pp. 2154-2177.

Jia et al., "Behavioral Relevance of the Dynamics of the Functional Brain Connectome", Brain Connectivity, vol. 4, No. 9, Nov. 1, 2014, pp. 741-759.

Keilholz et al., "Dynamic Properties of Functional Connectivity in the Rodent", Brain Connectivity, vol. 3, No. 1, Feb. 19, 2013, Online Publication: Jan. 29, 2013, pp. 31-40.

Killick et al., "Optimal Detection of Changepoints With a Linear Computational Cost", Journal of the American Statistical Association, vol. 107, No. 500, Oct. 17, 2012, pp. 1590-1598.

Klein et al., "Evaluation of volume-based and surface-based brain image registration methods", NeuroImage, vol. 51, No. 1, May 15, 2010, pp. 214-220.

Kyeong et al., "A New Approach to Investigate the Association between Brain Functional Connectivity and Disease Characteristics of Attention-Deficit/Hyperactivity Disorder: Topological Neuroimaging Data Analysis", PLOS One, vol. 10, No. 9, e0137296, Sep. 9, 2015, 15 pgs., doi: 10.1371/journal.pone.0137296.

Lindquist et al., "Evaluating dynamic bivariate correlations in resting-state fMRI: A comparison study and a new approach", NeuroImage, vol. 101, Nov. 1, 2014, Online Publication: Jun. 30, 2014, pp. 531-546.

Lindquist et al., "Modeling the hemodynamic response function in fMRI: efficiency, bias and mis-modeling", NeuroImage, vol. 45, Mar. 2009, pp. S187-S198, doi: 10.1016/j.neuroimage.2008.10.065.

Liu et al., "Time-varying functional network information extracted from brief instances of spontaneous brain activity", Proceedings of the National Academy of Sciences, vol. 110, No. 11, Mar. 12, 2013, pp. 4392-4397.

Lum et al., "Extracting insights from the shape of complex data using topology", Scientific Reports, vol. 3, No. 1236, Feb. 7, 2013, 8 pgs.

Mill et al., "From connectome to cognition: The search for mechanism in human functional brain networks", NeuroImage, vol. 160, Oct. 15, 2017, pp. 124-139.

Mitchell et al., "A novel data-driven approach to preoperative mapping of functional cortex using resting-state functional magnetic resonance imaging", Neurosurgery, vol. 73, No. 6, Dec. 2013, pp. 969-983.

Newman, "Fast algorithm for detecting community structure in networks", Physical Review E, vol. 69, No. 6, Jun. 18, 2004, 066133, 5 pgs.

Nicolau et al., "Topology based data analysis identifies a subgroup of breast cancers with a unique mutational profile and excellent survival", Proceedings of the National Academy of Sciences, vol. 108, No. 17, Apr. 26, 2011, pp. 7265-7270.

Owen et al., "High-level cognition during story listening is reflected in high-order dynamic correlations in neural activity patterns", bioRxiv, Jun. 10, 2021, 36 pgs., doi: 10.1101/763821.

Petri et al., "Homological scaffolds of brain functional networks", Journal of the Royal Society, 2014, vol. 11, 10 pgs., doi: 10.1098/rsif.2014.0873.

Petridou et al., "Periods of Rest in fMRI Contain Individual Spontaneous Events which are Related to Slowly Fluctuating Spontaneous Activity", Human Brain Mapping, vol. 34, No. 6, Jun. 2013, pp. 1319-1329.

Ponce-Alvarez et al., "Task-Driven Activity Reduces the Cortical Activity Space of the Brain: Experiment and Whole-Brain Modeling", PLoS Computational Biology, vol. 11, No. 8, Aug. 28, 2015, e1004445, 26 pgs.

Power et al., "Functional Network Organization of the Human Brain", Neuron, vol. 72, Nov. 17, 2011, pp. 665-678.

Preti et al., "The dynamic functional connectome: State-of-the-art and perspectives", NeuroImage, vol. 160, Oct. 15, 2017, pp. 41-54.

Prichard et al., "Generating Surrogate Data for Time Series with Several Simultaneously Measured Variables", Physical Review Letters, vol. 73, No. 7, Aug. 15, 1994, pp. 951-954.

Qin et al., "Hello neighbor: Accurate object retrieval with k-reciprocal nearest neighbors", IEEE Computer Society Conference on Computer Vision and Pattern Recognition, Jul. 2011, pp. 777-784, doi: 10.1109/CVPR.2011.5995373.

Raghubar et al., "Working memory and mathematics: A review of developmental, individual difference, and cognitive approaches", Learning and Individual Differences, vol. 20, Issue 2, Apr. 2010, pp. 110-122, doi: 10.1016/j.lindif.2009.10.005.

Rashid et al., "Dynamic connectivity states estimated from resting fMRI Identify differences among Schizophrenia, bipolar disorder, and healthy control subjects", Frontiers in Human Neuroscience, vol. 8, No. 897, Nov. 7, 2014, 13 pgs.

Ravizza et al., "The impact of context processing deficits on task-switching performance in schizophrenia", Schizophrenia Research, vol. 116, No. 2-3, Feb. 2010, pp. 274-279.

Romano et al., "Topological Methods Reveal High and Low Functioning Neuro-Phenotypes Within Fragile X Syndrome", Human Brain Mapping, vol. 35, No. 9, Sep. 2014, pp. 4904-4915.

Rombach et al., "Core-Periphery Structure in Networks", SIAM Journal on Applied Mathematics, vol. 74, No. 1, Feb. 18, 2014, pp. 167-190.

Roweis et al., "Nonlinear Dimensionality Reduction by Locally Linear Embedding", Science, vol. 290, Dec. 22, 2000, pp. 2323-2326.

(56) References Cited

OTHER PUBLICATIONS

Rubinov et al., "Complex network measures of brain connectivity: Uses and interpretations", NeuroImage, vol. 52, Issue 3, Sep. 2010, pp. 1059-1069.
Saggar, "Quantifying fluctuations in intrinsic brain activity using topology", Stanford University School of Medicine, Center for Interdisciplinary Brain Sciences Research (CIBSR), Presentation, Mar. 8, 2016, 7 pgs.
Saggar, "Saggar_Supplementary Movie M1", Vimeo, Jul. 11, 2017, Retrieved from: https://vimeo.com/225062058/ae65e20aaa, 2 pgs.
Saggar et al., "(only) time will tell: revealing the shape of brain dynamics during ongoing cognition", Presentation slide, Psychiatry and Behavioral Sciences, Stanford University School of Medicine, Oct. 12, 2016, 1 pg.
Saggar et al., "Precision dynamical mapping using topological data analysis reveals a unique hub-like transition state at rest", Nature Communications, vol. 13, No. 4791, 2022, 19 pgs., doi: 10.1038/s41467-022-32381-2.
Saggar et al., "Pushing the Boundaries of Psychiatric Neuroimaging to Ground Diagnosis in Biology", eNeuro, vol. 6, No. 6, Nov. 2019, 8 pgs., doi: 10.1523/ENEURO.0384-19.2019.
Saggar et al., "Towards a new approach to reveal dynamical organization of the brain using topological data analysis", Nature Communications, vol. 9, Article 1399, Apr. 11, 2018, 14 pgs.
Sheikholeslami et al., "WaveCluster: A Multi-Resolution Clustering Approach for Very Large Spatial Databases", Proceedings of the International Conference on Very Large Data Bases, 1998, 12 pgs.
Shen et al., "Using connectome-based predictive modeling to predict individual behavior from brain connectivity", Nature Protocols, vol. 12, No. 3, Mar. 2017, pp. 506-517, doi: 10.1038/nprot.2016.178.
Shine et al., "Estimation of dynamic functional connectivity using Multiplication of Temporal Derivatives", NeuroImage, vol. 122, Nov. 15, 2015, pp. 399-407.
Shine et al., "Temporal metastates are associated with differential patterns of time-resolved connectivity, network topology, and attention", Proceedings of the National Academy of Sciences, vol. 113, No. 35, Aug. 30, 2016, pp. 9888-9891.
Shine et al., "The Dynamics of Functional Brain Networks: Integrated Network States during Cognitive Task Performance", Neuron, vol. 92, No. 2, Oct. 19, 2016, pp. 544-554.
Singh et al., "Topological analysis of population activity in visual cortex", Journal of Vision, vol. 8, No. 8, Jun. 30, 2008, 18 pgs.
Singh et al., "Topological Methods for the Analysis of High Dimensional Data Sets and 3D Object Recognition", Eurographics Symposium on Point-Based Graphics, 2007, 11 pgs.
Smith, "The future of FMRI connectivity", NeuroImage, vol. 62, No. 2, Aug. 15, 2012, pp. 1257-1266.
Smith et al., "Correspondence of the brain's functional architecture during activation and rest", Proceedings of the National Academy of Science, vol. 106, No. 31, Aug. 4, 2009, pp. 13040-13045.
Smith et al., "Resting-state fMRI in the Human Connectome Project", NeuroImage, vol. 80, Oct. 15, 2013, pp. 144-168.
Smith et al., "Temporally-independent functional modes of spontaneous brain activity", Proceedings of the National Academy of Science, vol. 109, No. 8, Feb. 21, 2012, pp. 3131-3136.
Sourty et al., "Identifying Dynamic Functional Connectivity Changes in Dementia with Lewy Bodies Based on Product Hidden Markov Models", Frontiers in Computational Neuroscience, vol. 10, No. 60, Jun. 23, 2016, 11 pgs.
Sporns, "Making sense of brain network data", Nature Methods, vol. 10, No. 6, Jun. 2013, pp. 491-493.
Sporns, "Network attributes for segregation and integration in the human brain", Current Opinion in Neurobiology, vol. 23, No. 2, Apr. 2013, pp. 162-171.
Tagliazucchi et al., "Dynamic BOLD functional connectivity in humans and its electrophysiological correlates", Frontiers in Human Neuroscience, vol. 6, No. 339, Dec. 28, 2012, 22 pgs.
Tenenbaum et al., "A Global Geometric Framework for Nonlinear Dimensionality Reduction", Science, vol. 290, No. 5500, Dec. 22, 2000, pp. 2319-2323.
Ugurbil et al., "Pushing spatial and temporal resolution for functional and diffusion MRI in the Human Connectome Project", NeuroImage, vol. 80, Oct. 15, 2013, pp. 80-104.
Van Der Maaten et al., "Visualizing Data using t-SNE", Journal of Machine Learning Research, vol. 9, Nov. 2008, pp. 2579-2605.
Van Veen et al., "Kepler Mapper: A Flexible Python Implementation of the Mapper Algorithm", Journal of Open Source Software, vol. 4, No. 42, 2019, 3 pgs., doi: 10.21105/joss.01315.
Vidaurre et al., "Brain network dynamics are hierarchically organized in time", Proceedings of the National Academy of Sciences of the United States of America, vol. 114, No. 48, Oct. 30, 2017, pp. 12827-12832, doi: 10.1073/pnas.1705120114.
Welvaert et al., "neuRosim: An R Package for Generating fMRI Data", Journal of Statistical Software, vol. 44, No. 10, Oct. 2011, 18 pgs.
Woodcock et al., "Neural correlates of task switching in paternal 15q11-q13 deletion Prader-Willi syndrome", Brain Research, vol. 1363, Dec. 6, 2010, pp. 128-142.
Woolrich et al., "Mixture Models With Adaptive Spatial Regularization for Segmentation With an Application to FMRI Data", IEEE Transactions on Medical Imaging, vol. 24, No. 1, Jan. 1, 2005, 11 pgs.
Xu et al., "Dynamic connectivity detection: an algorithm for determining functional connectivity change points in fMRI data", Frontiers in Neurosciences, vol. 9, No. 285, Sep. 4, 2015, 19 pgs.
Yao et al., "Topological methods for exploring low-density states in biomolecular folding pathways", The Journal of Chemical Physics, vol. 130, No. 14, Apr. 14, 2009, 11 pgs.
Yarkoni et al., "Large-scale automated synthesis of human functional neuroimaging data", Nature Methods, vol. 8, No. 8, Aug. 2011, 10 pgs., published online Jun. 26, 2011.
Zalesky et al., "Time-resolved resting-state brain networks", Proceedings of the National Academy of Science, vol. 111, No. 28, Jul. 15, 2014, pp. 10341-10346.
Zhou et al., "Mapper interactive: A scalable, extendable, and interactive toolbox for the visual exploration of high-dimensional data", IEEE 14th Pacific Visualization Symposium, 2021, 10 pgs., doi: 10.1109/PacificVis52677.2021.00021.

* cited by examiner

SYSTEMS AND METHODS FOR SCALABLE MAPPING OF BRAIN DYNAMICS

CROSS-REFERENCE TO RELATED APPLICATIONS

The current application claims priority to U.S. Provisional Patent Application No. 63/254,026, filed Oct. 8, 2021; the disclosure of which is hereby incorporated by reference in its entirety.

STATEMENT OF FEDERALLY SPONSORED RESEARCH

This invention was made with Government support under contracts MH104605 and MH119735 awarded by the National Institutes of Health. The Government has certain rights in the invention.

FIELD OF THE INVENTION

The present invention relates to neuroimaging. More specifically, the present invention relates to systems and methods to map brain dynamics in a computationally efficient manner.

BACKGROUND

Modern noninvasive brain imaging technologies such as structural and functional magnetic resonance imaging promise to not only provide a better understanding of the neural basis of behavior but also to fundamentally transform how mental health disorders are diagnosed and treated. Unlike structural imaging, which has become standard in clinical practice, the clinical use of functional imaging (e.g., fMRI) has been limited to presurgical planning and functional mapping. One of the main reasons for the lack of fMRI-based clinical translation is that the traditional neuroimaging analyses (e.g., GLM or functional connectivity) tend to measure group-averaged (or central) tendencies, largely due to the low signal-to-noise ratio of the blood oxygenation level-dependent (BOLD) signal. Relatively newer functional connectome-based predictive modeling approaches have made some progress in generating insights at the single individual level, but several methodological issues need to be resolved before their clinical application becomes a reality.

SUMMARY OF THE INVENTION

This summary is meant to provide some examples and is not intended to be limiting of the scope of the invention in any way. For example, any feature included in an example of this summary is not required by the claims, unless the claims explicitly recite the features. Various features and steps as described elsewhere in this disclosure may be included in the examples summarized here, and the features and steps described here and elsewhere can be combined in a variety of ways.

In some aspects, the techniques described herein relate to a method to identify mental state in an individual, including obtaining neuroimaging data from an individual, constructing a shape graph of the neuroimaging data, and identifying a mental state of the individual based on the shape graph.

In some aspects, the techniques described herein relate to a method, where constructing a shape graph includes binning data within the neuroimaging data based on distances between data points in the neuroimaging data, and clustering the bins.

In some aspects, the techniques described herein relate to a method, where binning includes intrinsic binning or extrinsic binning, where intrinsic binning uses landmarks and intrinsic metrics of the data points, and extrinsic binning uses a d-dimensional grid with overlapping cells that fully covers a d-dimensional projection.

In some aspects, the techniques described herein relate to a method, where binning includes intrinsic binning, where intrinsic binning includes partitioning the data into r overlapping bins.

In some aspects, the techniques described herein relate to a method, where partitioning includes for each landmark, defining $$B_i := \left\{x : D'(x_i, x) \le 4 \in \cdot \frac{g}{100}\right\},$$

where g is a gain parameter that controls a level of overlap between each bin.

In some aspects, the techniques described herein relate to a method, further including determining geodesic distances of each data point in a data matrix associated with the neuroimaging data.

In some aspects, the techniques described herein relate to a method, where determining geodesic distances includes computing pairwise distances of each data point in the data matrix, and constructing a reciprocal k-nearest neighbors graph based on the pairwise distances, and where a shape graph is based on the geodesic distances.

In some aspects, the techniques described herein relate to a method, where constructing a shape graph includes landmarking the neuroimaging data.

In some aspects, the techniques described herein relate to a method, where landmarking uses farthest point sampling.

In some aspects, the techniques described herein relate to a method, where the neuroimaging data is obtained from a CT scan, an MRI scan, an fMRI scan, or combinations thereof.

In some aspects, the techniques described herein relate to a method, where constructing the shape graph includes computing pairwise distances of each data point in a data matrix of the neuroimaging data, constructing a reciprocal k-nearest neighbors (kNN) graph based on the pairwise distances, determining geodesic distances based on the kNN graph, landmarking the geodesic distances using farthest point sampling, intrinsically binning the landmarking data by partitioning the data into r overlapping bins, and clustering the bins.

In some aspects, the techniques described herein relate to a method, where partitioning includes for each landmark, defining $$B_i := \left\{x : D'(x_i, x) \le 4 \in \cdot \frac{g}{100}\right\},$$

where g is a gain parameter that controls a level of overlap between each bin.

In some aspects, the techniques described herein relate to a method, where the neuroimaging data is obtained from a CT scan, an MRI scan, an fMRI scan, or combinations thereof.

In some aspects, the techniques described herein relate to a system for identifying mental state in an individual, including a processor and a memory, where the memory contains instructions that when executed by the processor instructs the processor to obtain neuroimaging data from an individual, construct a shape graph of the neuroimaging data, and identify a mental state of the individual based on the shape graph.

In some aspects, the techniques described herein relate to a system, where constructing a shape graph includes binning data within the neuroimaging data based on distances between data points in the neuroimaging data, and clustering the bins.

In some aspects, the techniques described herein relate to a system, where binning includes intrinsic binning or extrinsic binning, where intrinsic binning uses landmarks and intrinsic metrics of the data points, and extrinsic binning uses a d-dimensional grid with overlapping cells that fully covers a d-dimensional projection.

In some aspects, the techniques described herein relate to a system, where binning includes intrinsic binning, where intrinsic binning includes partitioning the data into r overlapping bins.

In some aspects, the techniques described herein relate to a system, where partitioning includes for each landmark, defining $$B_i := \left\{ x : D'(x_i, x) \leq 4 \in \cdot \frac{g}{100} \right\},$$

where g is a gain parameter that controls a level of overlap between each bin.

In some aspects, the techniques described herein relate to a system, where the memory further includes instructions to determine geodesic distances of each data point in a data matrix associated with the neuroimaging data by computing pairwise distances of each data point in the data matrix, and constructing a reciprocal k-nearest neighbors graph based on the pairwise distances, and where a shape graph is based on the geodesic distances.

In some aspects, the techniques described herein relate to a system, where constructing the shape graph includes computing pairwise distances of each data point in a data matrix of the neuroimaging data, constructing a reciprocal k-nearest neighbors (kNN) graph based on the pairwise distances, determining geodesic distances based on the kNN graph, landmarking the geodesic distances using farthest point sampling, intrinsically binning the landmarking data by partitioning the data into r overlapping bins, and clustering the bins.

Other features and advantages of the present invention will become apparent from the following detailed description, taken in conjunction with the accompanying drawings which illustrate, by way of example, the principles of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 4B illustrates exemplary data of core-periphery structure observed in individual datasets in accordance with various embodiments.

DETAILED DESCRIPTION

Figure 1:
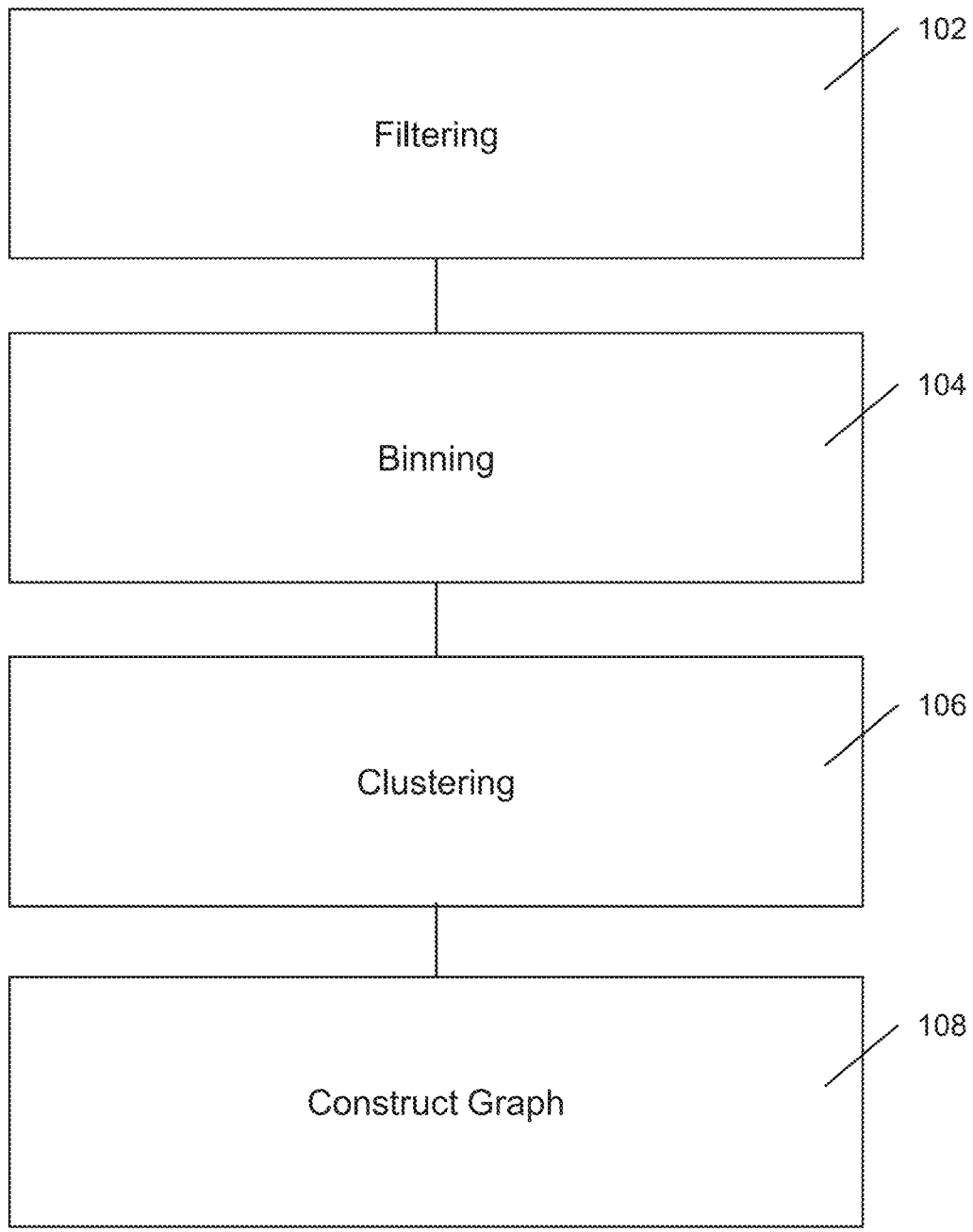
FIG. 1 illustrates an exemplary process to construct a shape graph in accordance with various embodiments.

Turning now to the drawings, systems and methods for scalable mapping of brain dynamics and uses thereof are provided. Many embodiments are capable of mapping brain dynamics in a computationally efficient way. In many embodiments, shape graphs can be produced which can operate as interactive network representations of dynamic brain activity data. Methods for automatically interpreting the structure of the shape graphs are described herein. In various embodiments, the mapped brain dynamics can be used to indicate which type of treatment protocol is likely to be most effective for the particular individual. In many embodiments, the treatment includes transcranial magnetic stimulation, pharmaceutical treatment, and/or any other mental condition treatment as appropriate to the requirements of specific applications of embodiments of the invention.

Recently, an approach called Mapper from the field of topological data analysis (TDA) has shown promise in generating data-driven insights from fMRI data at the single-participant level. (See e.g., Geniesse, C., et al. (2019). Generating dynamical neuroimaging spatiotemporal representations (DyNeuSR) using topological data analysis. Network Neuroscience, 3(3) and Saggar, M., et al. (2018). Towards a new approach to reveal dynamical organization of the brain using topological data analysis. Nature Communications, 9(1); the disclosures of which are hereby incorporated by reference in their entireties.) TDA is a recently developed field of mathematics that combines ideas from algebraic topology and network science, and TDA-based algorithms have gained recognition for their ability to generate robust, interpretable, and multiscale models of high-dimensional data. Among these techniques, Mapper is a particularly successful method that produces a shape graph—a graphical representation of the underlying structure or shape of the high dimensional data. (See e.g., Lum, P. Y., et al. (2013). Extracting insights from the shape of complex data using topology. Scientific Reports, 3, 1-8 and Singh, G., et al. (2007). Topological methods for the analysis of high dimensional data sets and 3d object recognition. Symposium on Point-Based Graphics, 91-100; the disclosures of which are hereby incorporated by reference in their entireties.) Although Mapper bears some similarity to established dimensionality reduction methods, it extends and improves upon such methods by (1) reincorporating high-dimensional information in the low-dimensional projection and thereby putatively reducing information loss due to projection, and (2) producing a compressed (and putatively robust) graphical representation of the underlying structure that can be analyzed using network science tools. The revealed graphical representation can also be annotated using meta-information to extract further insights about the underlying structure of the data. Analogous to how a geographical map encodes large-scale topographical features such as mountains, valleys, and plains, a shape graph produced by Mapper encodes essential topological features such as connectivity, adjacency, and enclosure. In the context of functional neuroimaging data, the shape graph encodes the higher-order spatiotemporal features of brain activity that underlie cognition.

Mapper has been previously applied to generate insights from the underlying shape of data in oncology, transcriptomics, spinal cord and brain injury, fragile X syndrome, gene expression, protein interaction, and materials science. In the field of neuroimaging, Mapper has been recently used to explore the whole-brain dynamics associated with different cognitive tasks and transitions during simulated "ongoing" cognition; visualize the distributed and overlapping patterns of neural activity associated with different categories of visual stimuli via the DyNeuSR platform; and relate gene co-expression to brain function.

While initial neuroimaging applications of Mapper have been promising, several key methodological improvements to the processing pipeline are still needed, especially before the approach can be scaled up to larger consortium-style datasets. First, Mapper requires embedding the data into a low-dimensional space via a user-chosen target dimension d and filter function $f: \mathbb{R}^p \to \mathbb{R}^d$. Although the Mapper pipeline includes a partial clustering step to re-incorporate some of the information loss due to initial projection, low-dimensional embedding is by definition an inefficient step due to an invariable loss of information by going down 2-3 orders of magnitude in dimensions. Second, the Mapper approach traditionally rescales the low-dimensional embedding to be inside a grid with overlapping cells. The size of the grid and the level of overlap are controlled by the resolution (r) and gain (g) parameters, respectively. A caveat with this construction is that the number of cells in a grid with fixed r, g grows exponentially in dimension d, leading to inefficient computations. Given recent evidence (and growing consensus) that large-scale consortium-level sample sizes are essential for accurately and reproducibly linking brain function and behavior, computational costs and scalability have thus become critical issues. Third, although Mapper results are stable over parameter perturbations, initial fine tuning of Mapper parameters is required due to their dependence on the data acquisition parameters. Altogether, this suggests that a systematic approach is required for exploring Mapper parameters, including f, d, r, and g, in order to select those that best capture the multi-scale information putatively available in the neuroimaging data.

Many embodiments of the present disclosure provide significant methodological advances for each step of the Mapper processing pipeline and introduce novel approaches to generate neurobiological insights from the shape graphs. Many embodiments move away from dimensionality reduction altogether in favor of working directly with distance metrics in the original acquisition space, leading to a significantly faster pipeline that simultaneously avoids information loss due to low-dimensional projection. Towards optimizing parameter space exploration, numerous embodiments provide a semi-automatic parameter selection scheme using neuroimaging-specific objectives to remove all but a few parameter choices. Apart from the methodological advancements, certain embodiments introduce methods to generate novel neurobiological insights. For example, some embodiments introduce quantitative tools from computational optimal transport (OT) for better handling of overlapping graphical annotations as they consider both global and local properties of the graph. Further, to better anchor the Mapper representations into cognitive neuroscience, a number of embodiments provide a novel approach for annotating shape graph nodes using the NeuroSynth meta-analytic cognitive decoding framework. (See e.g., Yarkoni, T., et al. (2011). Large-scale automated synthesis of human functional neuroimaging data. Nature Methods, 8(8), 665-670; the disclosure of which is hereby incorporated by reference in its entirety.)

Many embodiments are capable of reproducing and independently validating results from Mapper while also revealing several new neurobehavioral insights. In numerous embodiments, individual differences in the mesoscale structure (e.g., modularity) of the generated shape graphs reveals important neurobehavioral insights—for example, recruiting task-specific brain circuits led to better performance on the task. Further, applying tools from optimal transport on shape graphs, various embodiments provide an avenue to study relations and dependencies between cognitive tasks—for example, a higher degree of overlap between brain circuits engaged during working memory and math is required for better performance on the math task. Lastly, by linking the NeuroSynth meta-analytic database with generated shape graphs, certain embodiments provide a new avenue to study and decode cognitively anchored changes in mental states at the highest temporal resolution. Such decoding can be helpful in revealing the negative impact of over-reflection or attention-lapses on task performance.

Framework

Many embodiments utilize a multi-step process to construct a shape graph from a data set (e.g., $X \in \mathbb{R}^P$). FIG. 1 illustrates an exemplary process 100 used in various embodiments to construct a shape graph. In many embodiments, the process involves filtering 102, binning, 104, partial clustering 106, and graph construction 108, which are described in more detail herein. Additional details in such embodiments can be found in U.S. Pat. No. 11,330,730 (issued May 17, 2022; filed as Ser. No. 16/171,255), which is hereby incorporated by reference in its entirety.

In many embodiments, filtering 102 uses a dimension-reducing filter function to determine a low-dimensional embedding of X. In various embodiments, the filter function is $f: \mathbb{R}^P \to \mathbb{R}^d$.

Binning 104 of many embodiments uses overlapping d-dimensional hypercubes. Functionally, if points in X are in the same hypercube, they are placed in the same bin.

During clustering 106, many embodiments further cluster points into smaller cluster bins in the same cover bin. This further clustering can account for faraway points (in p-dimensional space) from erroneously landing in the same cover bin during projection.

Various embodiments construct graphs 108. In many such embodiments, the graphs use cluster bins as nodes. Edges within the graph connect cluster bins that share points.

However, the number of bins increases exponentially, as dimensionality increases. Thus, traditional methods rely on the initial embedding processes to reduce dimensionality to one or two dimensions. However, neuroimaging data is problematic, as embedding can require reduction of up to fifty dimensions.

To avoid issues imposed by low-dimensional embedding, many embodiments alter traditional mapping techniques (e.g., embodiments disclosed in U.S. Pat. No. 11,330,730 cited previously) to avoid dimensionality reduction, thus avoiding information or data loss due to dimensionality reduction. Many embodiments transform a matrix to approximate the geometry of temporal trajectories through brain activity space. Many such embodiments obtain matrix D that includes distances between whole and/or parcellated brain volumes in the native high dimensional. Such embodiments produce a transformed matrix D' that approximates the geometry of temporal trajectories through brain activity space. Numerous embodiments obtain D' as geodesic distances on a reciprocal k-nearest neighbor (kNN) graph. While standard kNN have data points as nodes, and each point is connected to its k-closest neighbor, the reciprocal variant adds an extra pruning step to reduce the effect of outliers. Other embodiments apply a moderate-to-high dimensional projection and calculate distances (e.g., Euclidean distances) to obtain D'.

Figures 2A, 2B:
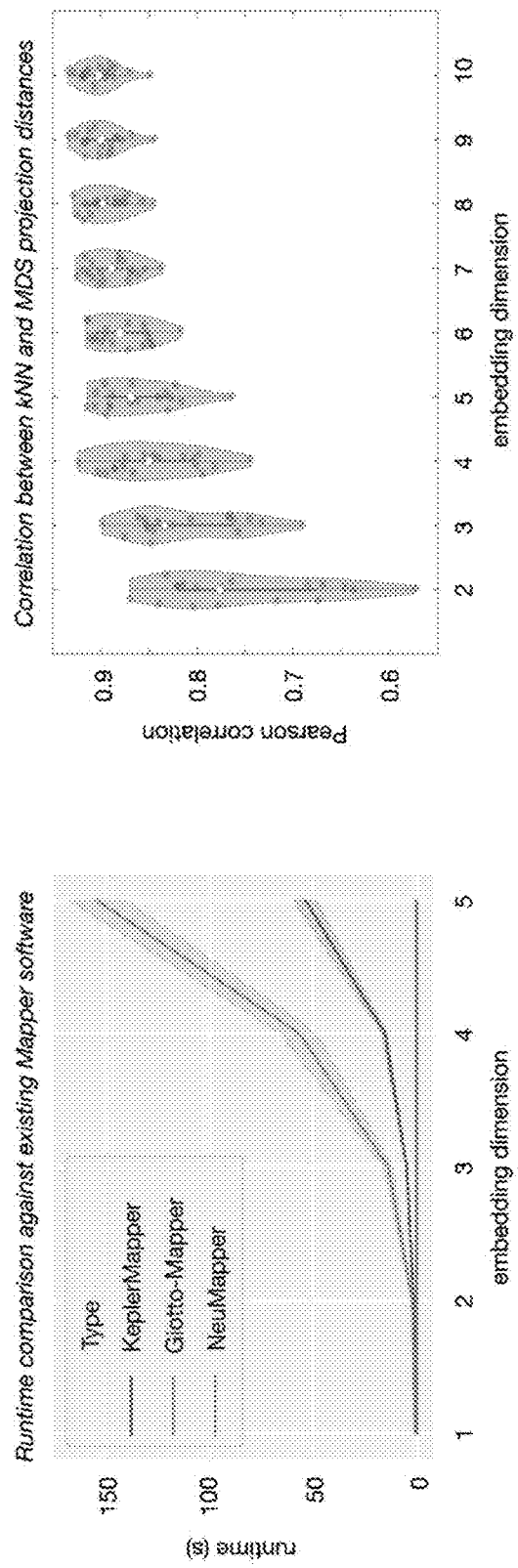
FIG. 2A illustrates an exemplary comparison of runtimes of one exemplary embodiment "NeuMapper" as compared to other mapping programs "KeplerMapper" and "Giotto-Mapper".
FIG. 2B illustrates exemplary data showing the Pearson correlation between graph geodesic distances and distances after MDS projection increased with the dimension of the target space in accordance with various embodiments.

Further embodiments perform intrinsic binning to produce overlapping partitions. Certain embodiments use only D' without any ambient space. Intrinsic binning is a general way of scaling up computations and does not rely on a particular method of generating D'. As such, certain embodiments can apply intrinsic binning on geodesic distances or Euclidean distances. Intrinsic binning has an advantage of lower runtimes and avoids projection-related information loss. FIG. 2A illustrates an exemplary comparison of runtimes of one exemplary embodiment "NeuMapper" as compared to other mapping programs "KeplerMapper" and "Giotto-Mapper." Additionally, FIG. 2B illustrates exemplary data from the exemplary NeuMapper embodiment showing that distances on the kNN graph can be embedded in Euclidean space using multidimensional scaling (MDS). While this process can cause distortion, the amount of distortion decreases with increasing embedding dimension. As previously mentioned, high embedding dimension increases computations, runtime, and ultimately cost in standard mapping approaches, while FIGS. 2A-2B illustrate that many embodiments can work directly with the kNN distances and avoid this projection loss.

Additional embodiments provide semi-automated parameter selection framework to guide parameter exploration and selection. Many embodiments utilize a heuristic algorithm that leverages the autocorrelation structure naturally present in fMRI data (due to the slow hemodynamic response) and returns a parameter choice that presents a mesoscale view—i.e., between views that are "too local" or "too global"—of the data.

Figure 3:
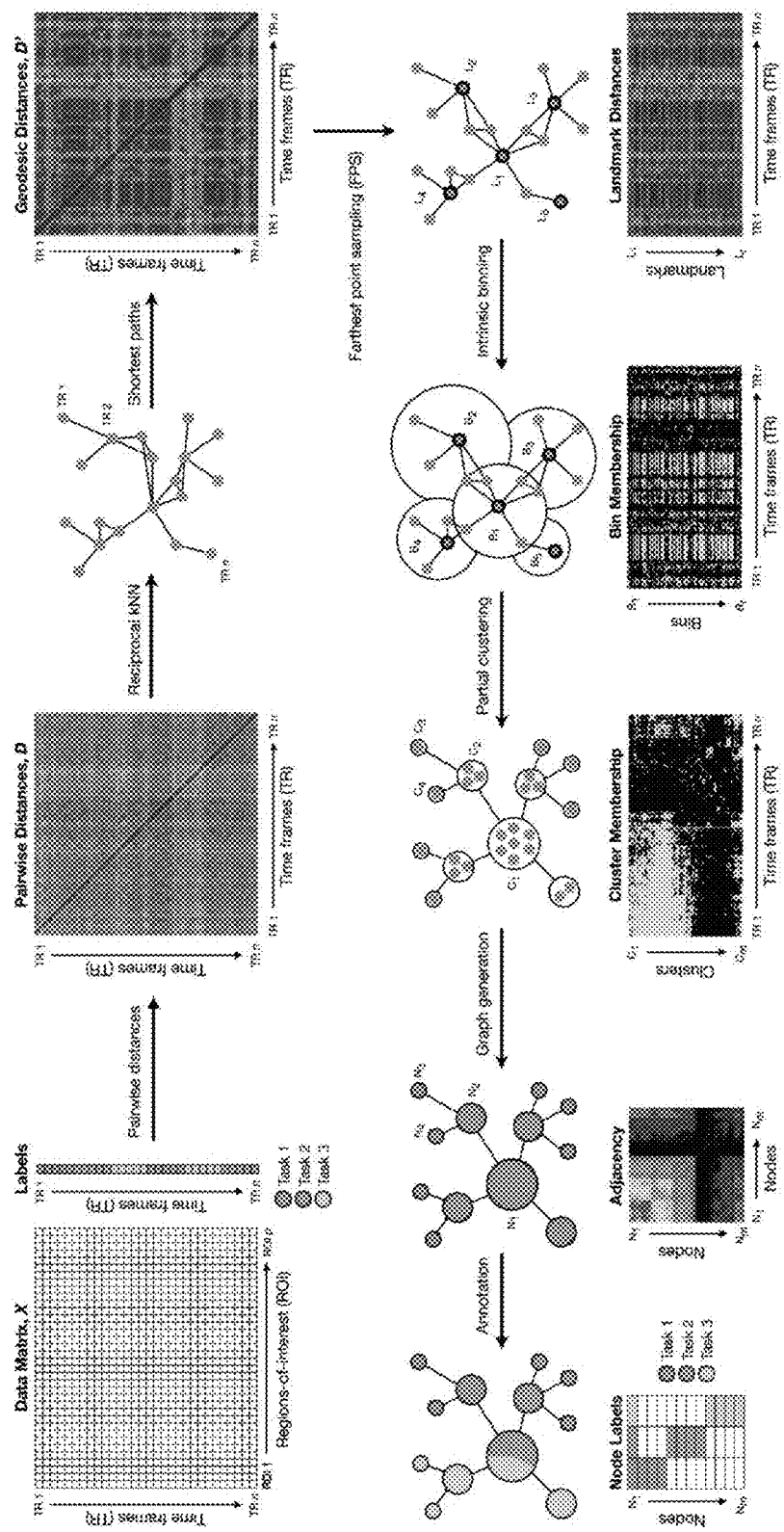
FIG. 3 provides an exemplary graphical schematic of implementing the modifications to constructing a shape graph in accordance with various embodiments.

FIG. 3 provides an exemplary graphical schematic of embodiments implementing the modifications noted above. Many such embodiments begin by obtaining a data matrix. As illustrated, a matrix X can have n×p dimensions, where columns may correspond to voxels, regions of interest (e.g., brain regions of interest), or another spatial unit and rows can correspond to acquisitions activation patterns, including of whole-brain activation patterns. Standard neuroimaging techniques such as functional connectivity (FC) or dynamic functional connectivity (dFC) work on the columns of the data matrix to produce one or more p×p correlation matrices. While such techniques capture the coactivation of brain regions in response to external stimuli, an alternative approach is to study n×n matrices of distances between acquisitions to understand the overall geometry of the states traversed by the brain during the experiment. Examples such as Anscombe's quartet and related generalizations show that studying this underlying geometry may provide strictly complementary insights.

In many embodiments, data matrices have rows labeled by the tasks used to acquire the data. For example, in the exemplary schematic illustrated in FIG. 3, the tasks included (Rest (R), Memory (M), Video (V), and Math/Arithmetic (A)). To understand the high-dimensional geometry of the data, linear and/or nonlinear dimension reduction methods can be used. However, linear approaches do not consider the intrinsic geometry of data. In contrast, nonlinear approaches attempt to capture intrinsic geometry by considering the local neighborhood of each data point, as determined by a k-nearest-neighbor (kNN) graph built on the data. While promising for capturing the geometry of brain states, such approaches work best when the data is sampled both uniformly and without noise from its underlying distribution, and are otherwise prone to a type of error called topological instability. Because fMRI data is inherently noisy and suffers from sampling variability, such error may be unavoidable; thus, some embodiments resort to specialized techniques that capture intrinsic geometry while mitigating such errors due to noise.

Standard Mapper algorithms utilize filtering, binning, and partial clustering to construct a graph (see e.g., FIG. 1 and associated text). However, low dimensional projection (filtering) tends to erroneously collapse points close together, and partial clustering attempts to reverse this collapse. Many embodiments address the topological instability of kNN-based approaches by fusing the partial clustering step from traditional Mapper algorithms.

Reciprocal kNN

To gain access to the intrinsic geometry of the high-dimensional data, many embodiments leverage a particular type of kNN graph and the matrix of geodesic distances on this graph. First, such embodiments fix a choice of metric for dataset X (e.g., the $L^1$ metric, also known as the Manhattan distance) and use this to build an n×n matrix D of pairwise distances between the rows of X. $L^1$ is preferable over the more standard $L^2$ (Euclidean) metric due to higher effectiveness for nearest neighbor searches in high dimensions. Next, for each row x, such embodiments select the top-k nearest neighbors and call this set $NN_k(x)$. These embodiments then build a graph G where the node set is indexed by X, and an edge $(x_i, x_j)$ is added whenever $x_i \in NN_k(x_j)$ and $x_j \in NN_k(x_i)$. This final condition of creating edges by a symmetric criterion is referred to as reciprocal kNN. Notice that these operations can be easily implemented using sort operations. Finally, such embodiments define a new metric matrix D' by taking the shortest path distances (i.e., geodesic distances) on G. Note that this can be implemented in $O(|V|^3)$ time using a Floyd-Warshall algorithm, although the next section shows that an alternative strategy can utilize a small number of calls to the $O((|V|+|E|)\log(|V|))$ Dijkstra algorithm.

The choice of reciprocal kNN helps stabilize the noise levels of fMRI data by pruning connections across areas with different local data density. Many embodiments further use a tall, skinny submatrix of the matrix D' with columns corresponding to chosen landmarks.

Finally, the dimensionality of the data has an important effect on the computation of nearest neighbors. While techniques such as kd-trees can be very effective for nearest neighbor queries in dimensions below 10, for dimensions p>10 it may be preferable to compute nearest neighbors via a linear scan which runs in in O(np) time. To obtain sublinear dependence on n, it is possible to use techniques such as locality sensitive hashing. Additionally, when applying such methods to voxel-level fMRI data, where p is in the order of hundreds of thousands, certain embodiments use scalable approximate nearest neighbor methods.

Many embodiments utilize the reciprocal kNN methodology in lieu of traditional filtering steps (e.g., low-dimensional projection) to obtain a pairwise distance matrix D' that encodes the intrinsic geometry of the data. Further embodiments carry out a sampling procedure to obtain landmarks on the data for use in a binning step while assuming access to only D'.

Farthest Point Sampling (FPS)

FPS is a greedy algorithm for landmarking data. In this methodology, certain embodiments start with a seed point $x_0 \in X$. Then such embodiments choose $x_1$ to be a point that maximizes the D' distance to $x_0$, possibly with some arbitrary tie-breaking between equidistant points. Next, such embodiments choose $x_2$ to be a point that maximizes the distance to $\{x_0, x_1\}$, where the latter is defined as $\min(D'(x_2, x_0), D'(x_2, x_1))$. The algorithm proceeds in this manner until $X_{r-1}$ has been chosen, where r is a user-specified resolution parameter. Note also that each step may utilize a call to Dijkstra's algorithm for a total of r calls, as well as some max and min operations. The final output of this step is a set of landmark points $\{x_0, x_1, \ldots, x_{r-1}\}$ and a real number $\epsilon$ corresponding to the maximal distance from any point in X to its closest landmark point according to D'.

Towards reproducibility, various embodiments minimize randomness during landmark selection in two ways. First, while FPS typically begins with the random selection of an initial seed point, some embodiments instead define the seed point to always be the first row of X. This ensures that landmark selection is at least reproducible given the same input matrix X. Second, while the sequence of landmarks visited during FPS depends heavily on the choice of initial seed point, the following argument shows that the output of applying FPS to D' is minimally affected by randomness in the seed point. First, FPS achieves a 2-approximation of the optimal locations for placing landmarks (also known as the metric k-center problem). Next, by appealing to this result and additional results from metric geometry, any two sets of samples obtained by FPS yield distance matrices that are guaranteed to approximate the input distance matrix D' up to a small multiplicative factor. This approximation guarantee in turn ensures that landmark selection is minimally affected by randomness, and the approximated distance matrix converges to D' as the number of landmarks approaches the number of data points.

Intrinsic Binning

Having constructed landmarks, further embodiments partition the data into r overlapping bins as follows: for each landmark $x_i$, define:

$$B_i := \left\{ x : D'(x_i, x) \le 4 \epsilon \cdot \frac{g}{100} \right\},$$

where g is a gain parameter that controls the level of overlap. The choice of $\epsilon = g/25$ is set up for the following scenario: suppose $x_i, x_j$ are two landmarks satisfying $D'(x_i, x_j) = 2\epsilon$ and p is a point such that $D'(x_i, p) = \epsilon = D'(p, x_j)$. Then a gain of 50 (interpreted as 50%) allows the inclusion $x_j \in B_i$. Certain embodiments set the minimum value of g to 25, which ensures that the collection of bins $B_i$ fully covers X. This procedure of binning points using landmarks and the intrinsic metric D' as "intrinsic binning." In contrast, the standard Mapper algorithm uses a d-dimensional grid with overlapping cells that fully covers a d-dimensional projection of X—this approach is referred to as "extrinsic binning" due to its use of the ambient space $\mathbb{R}^d$. Note that d-dimensional cubes tend to be mostly empty when d is large, and hence the extrinsic binning approach becomes increasingly wasteful and computationally expensive as d increases.

To complete the description of the intrinsic binning procedure, consider the case where G is not connected. In some techniques utilizing kNN graphs, one often proceeds by dropping all but the largest connected component, which directly causes information loss. In the setting of the present embodiments, however, such embodiments simply reallocate the number of landmark points to use for each connected component. Specifically, such embodiments allocate $$\text{ceiling}\left(r \cdot \frac{\text{\# nodes in component}}{\text{total \# nodes}}\right)$$

landmark points to each connected component and perform binning for each component individually as above.

Toward scalability, computation times of intrinsic vs. extrinsic binning can be considered. As noted in FIG. 2A, standard open-source Mapper implementations (Kepler-Mapper and Giotto-Mapper) suffered from significant slowdowns when carrying out the extrinsic binning procedure of the traditional Mapper approach after projecting data to spaces of four or more dimensions. A natural question then becomes: how many dimensions are needed to represent data? Intuitively, more dimensions are better for preserving information. In our case, to use existing open-source Mapper implementations after constructing a reciprocal kNN graph and computing graph geodesic distances, the easiest approach would be to apply an MDS projection in analogy with the Isomap algorithm for dimension reduction. FIG. 2B illustrates that the Pearson correlation between graph geodesic distances and distances after MDS projection increased with the dimension of the target space. Specifically, 4 and 8 dimensional projections were needed, respectively, to achieve correlation values exceeding 0.85 and 0.9. This suggests that information loss would be reduced by using a larger projection dimension, which unfortunately runs into the issue of slow runtime (FIG. 2A). In contrast, once a matrix of distances D' has been provided, a projection-free intrinsic binning approach can be naively implemented in O(nr) operations, where n is the number of data points and r is the number of landmarks. In particular, there is no dependence on projection dimension, whereas the extrinsic binning approach requires computing a d-dimensional grid comprising a number of cells in the order $O(r^d)$, i.e., exponential dependence on dimension (FIG. 2A). Thus, where a moderate number of dimensions (>10) are needed to represent the data, intrinsic binning should be preferable to using extrinsic binning. Note that in standard neuroimaging literature where PCA is used for dimension reduction, standard choices for the embedding dimension range from 5-10 up to 50 dimensions.

Partial Clustering and Graph Generation

For partial clustering, each bin $B_i$, single linkage clustering can be applied using the native, high dimensional metric D. Some embodiments investigate the histogram of linkage values and set a cutoff threshold to be the first histogram bin edge at which the histogram bin count becomes zero. This threshold is then used to partition $B_i$ into clusters.

Intuitively, if $B_i$ contains two well-separated clusters, then this cutoff value would separate the clusters. This method has its limitations, namely that if a bin contains clusters of differing densities, it tends to recover only the high-density cluster. However, this simple histogram-based method works well for our neuroimaging.

The output of the partial clustering step is an overlapping collection of bins $C_0, C_1, \ldots, C_N$. The final shape graph is generated by taking the $C_i$ as nodes and inserting edges ($C_i$, $C_j$) whenever $C_i$ and $C_j$ share one or more data points.

Annotations

Labels on data points are conveniently aggregated into annotations for each node of the shape graph. Specifically, given a shape graph on N nodes and T categorical labels, many embodiments construct an N×T annotation matrix where entry (v, t) counts the number of data points labeled t that belong to node v. The row vector (v,•) comprises an annotation for node v. These annotations can be displayed as pie charts or used downstream in further analysis.

Parameter Optimization

As is standard in machine learning pipelines, parameter optimization for many embodiments may be carried out via cross-validation. This section outlines one such heuristic for optimizing parameters (r, k, g) that uses the autocorrelation structure of fMRI data. Specifically, given a data matrix X, many embodiments plot the autocorrelation function for each column of X and visually determine the "elbow", i.e., the number of lags at which the autocorrelation function becomes level. Further, such embodiments multiply this number by the sampling period of the dataset to obtain a critical lag τ in units of seconds. In the fMRI context, autocorrelation is naturally present due to the hemodynamic response function (HRF), and it is desirable to view data at a scale which incorporates signal that is not just driven by HRF. Toward this goal, such embodiments specify a percentage value α and set the criteria—denoted AutoCorrCrit—that an output shape graph should have at least α% nodes containing data points that were acquired at least τ seconds apart, i.e., are less susceptible to the HRF.

The procedure outlined above heuristically attempts to mitigate the dependency of the shape graph nodes on autocorrelated samples. However, thus far there are not any conditions guaranteeing that the output shape graphs will be sufficiently connected for carrying out downstream analysis using network science tools. To this end, many embodiments introduce an additional percentage value β and require that for group-level analysis, each shape graph contains at least β% of its nodes in its largest connected component. To ensure consistency in group-level analysis, many embodiments use a consensus (r, k, g) triplet which can be used to generate shape graphs for each dataset, i.e., for data acquired under the same scanning parameters. In summary, many embodiments first obtain parameters for each shape graph in the dataset according to α, obtain a consensus (r, k, g) triplet for the full dataset, and finally perturb the consensus triplet (if necessary) to satisfy the connectivity constraint β.

In detail, the optimization at the level of a single subject is carried out as follows. First many embodiments specify a broad range of values for the r parameter, and choices of small initial k and g parameters. For each value of r, such embodiments carry out the following procedure:

Compute a shape graph with the initial values for k and g.
Verify that AutoCorrCrit is satisfied. If not, increment k←k+1 and g←g+3.
Iterate until AutoCorrCrit is satisfied.

More specifically, for the r parameter, an exemplary embodiment explored 10 different values evenly spaced along the interval ["floor" (0.1·n), "floor" (0.3·n)], where n is the number of time points in the dataset. For the k and g parameters, this exemplary embodiment used small initial values of k=3 and g=25, respectively. The step sizes for incrementing k,g were chosen to be the smallest integers such that perturbing the corresponding parameters produced observable changes to the shape graphs.

Multiple r values may have the same optimal (k,g) parameters. To reduce these choices down to a manageable number, certain embodiments cluster the different optimal k values (equivalently g values, as incrementing k,g together) using the classical DBSCAN density-based clustering algorithm. Certain embodiments then discard all but the top three largest clusters of optimal k values. Typically, each cluster will have a unique k value, but to ensure this programmatically, the minimum k value can be selected for each cluster. Finally, for each cluster various embodiments record the most frequently occurring r value. This yields a total of three optimal (r,k,g) triplets for a data matrix X.

Many embodiments repeat the procedure above for the data matrix for each subject. To obtain consensus, certain embodiments use a simple voting procedure to select three (r,k,g) triplets that occur most frequently among the optimal triples for each subject. This procedure returns three consensus—(r,k,g) triplets at the group level.

Having chosen a consensus (r,k,g) triplet, many embodiments verify for each dataset that each of the shape graphs had over β% of the nodes in the largest connected component. If not, such embodiments increase k and decrease r (both steps incorporate more global information) in small steps of 3 and 5 respectively until all graphs have a sufficient fraction of nodes in the largest connected component.

Mesoscale Structure of Shape Graphs Informs Behavior

Complex networks are often characterized by their hierarchical structure, ranging from local descriptors at the node or edge level to global descriptors at the whole-graph level. At the mesoscale range are cohesive groups or clusters of nodes that are more densely connected to each other than to other nodes. In the most well-known model of these mesoscales, community structure, a group of nodes have higher density of within-group connections than a null model graph. A second, increasingly popular model is the core-periphery structure, where the network contains a dense core with high within-group connectivity that also occupy central positions in the network, and a periphery of nodes that are sparsely connected to each other. Community and core-periphery structures have both been used extensively to gain insights into predictive components of functional brain networks, and new approaches into studying such mesoscale structures promise to deliver fundamentally new insights.

Figure 4A:
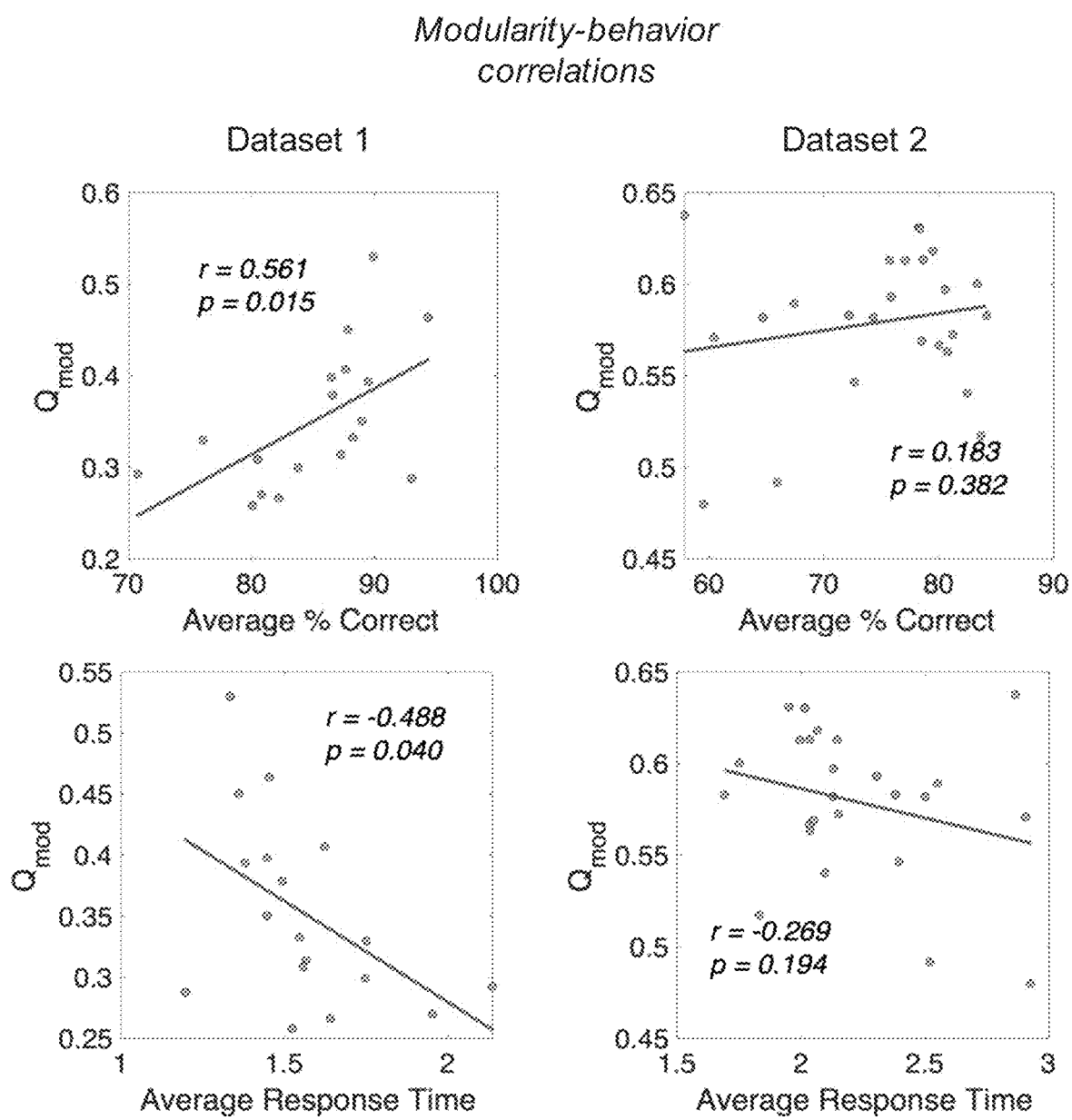
FIGS. 4A-4B illustrate exemplary data showing the modularity-behavior correlations for individual datasets in accordance with various embodiments.
Figure 4B:
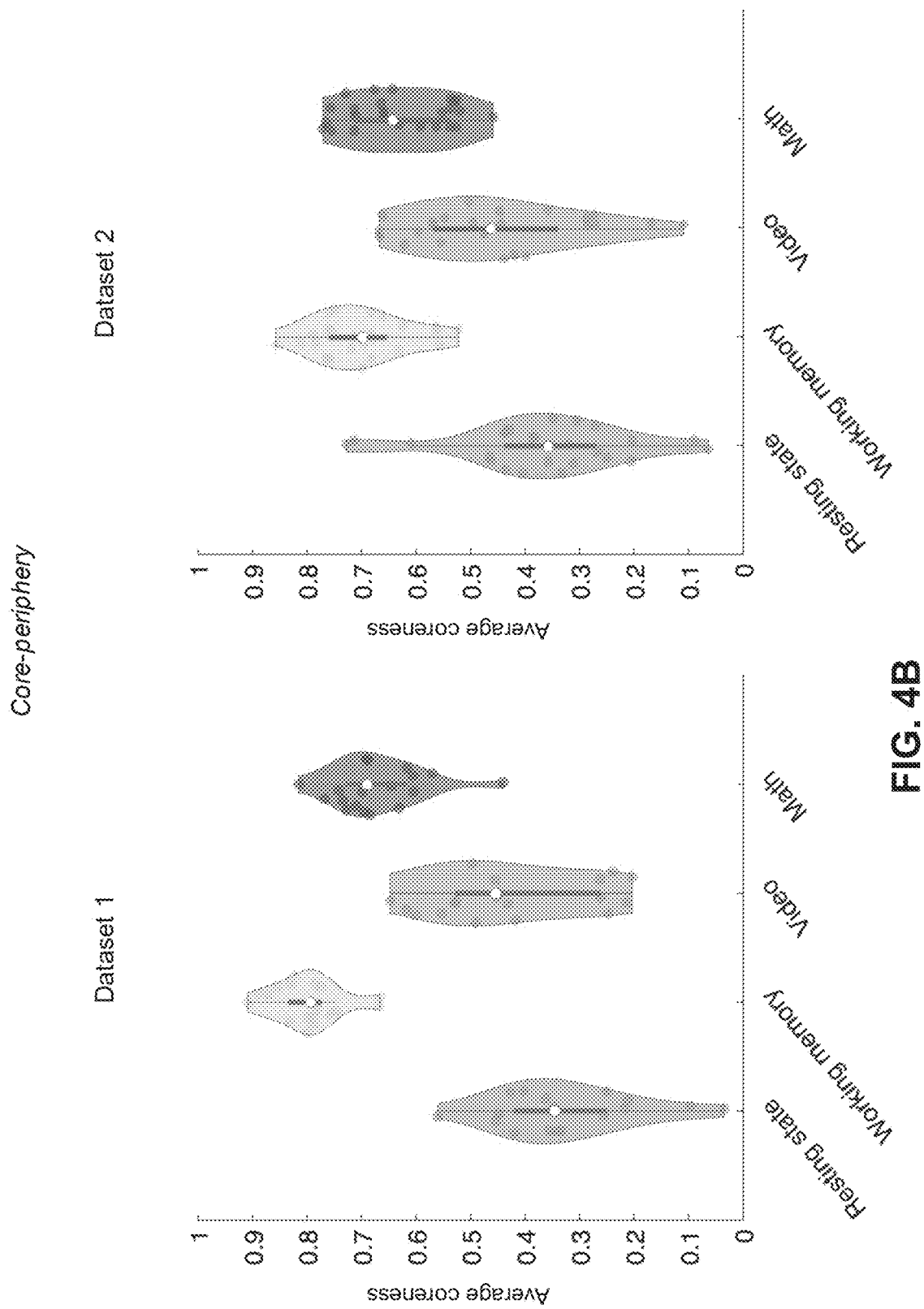
Figure 5A:
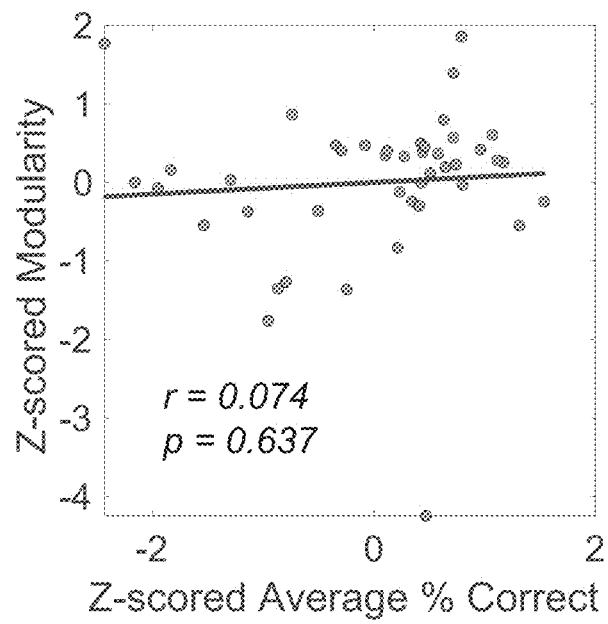
FIGS. 5A-5B provide exemplary data showing that the exemplary data in FIGS. 4A-4B cannot be reproduced via null models that preserve linear properties of the data in accordance with various embodiments.
Figure 5A:
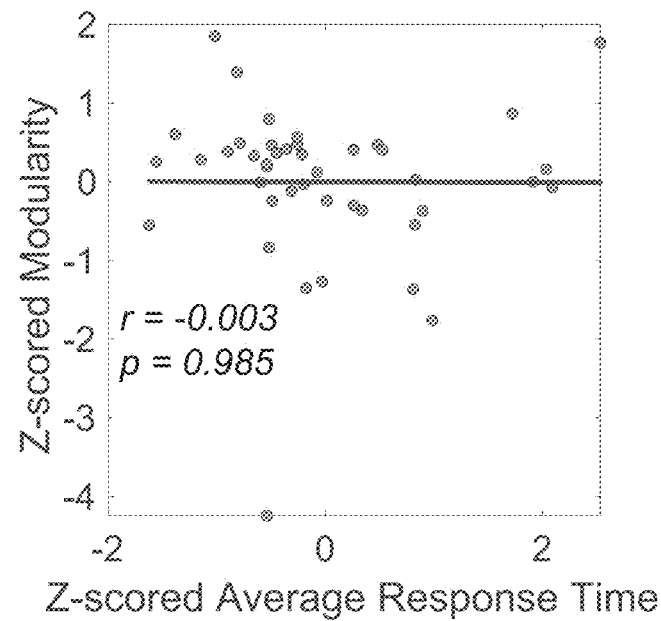
Figure 5B:
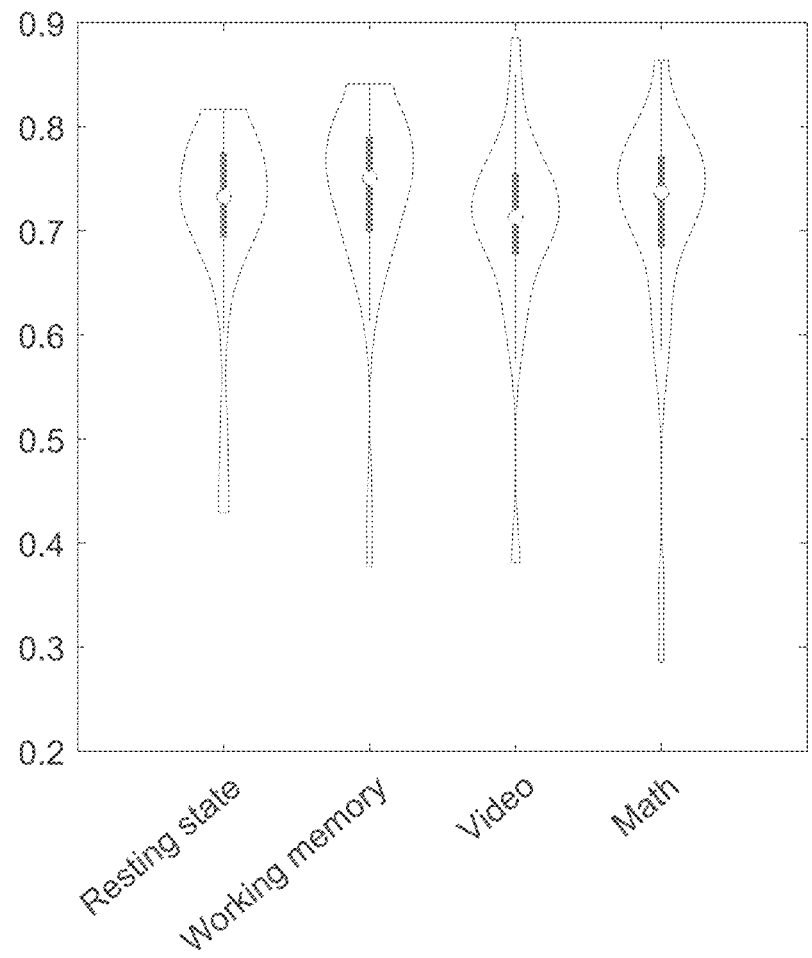
Figure 6:
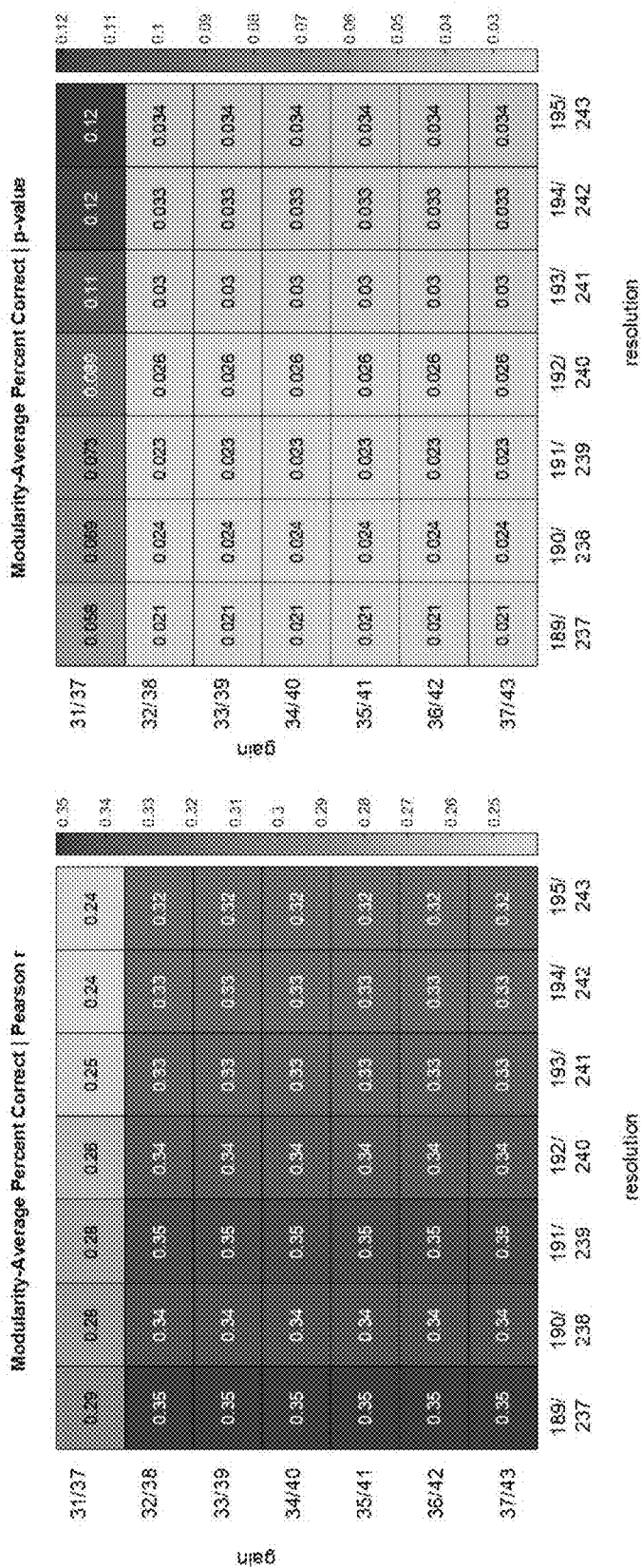
FIG. 6 provides exemplary data showing results from a grid search over a moderate region of parameter space surrounding the optimal parameter values for individual datasets in accordance with various embodiments.

Given a graph partition that yields communities, the modularity Q-score ($Q_{mod}$) measures the quality of modularity or community structure (Newman, 2006). A higher $Q_{mod}$ score implies better community structure. FIGS. 4A-4B illustrate exemplary data showing the modularity-behavior correlations for individual datasets. Specifically, in FIG. 4A, for Dataset 1 (n=18), it was observed that the task-based modularity of shape graphs is significantly positively correlated with average task accuracy (r=0.561, p=0.015) and significantly negatively correlated with response time (r=−0.488, p=0.040). For Dataset 2, (n=25) it was observed that the task-based modularity was positively correlated with average task accuracy (r=0.183, p=0.382) and negatively correlated with response time (r=−0.269, p=0.194). FIG. 4B illustrates exemplary data of core-periphery structure observed in each dataset, separately. One-way ANOVA revealed significant effects of task in Dataset 1 (F(3,68)=67.0, p=2.9·10$^{-20}$) and Dataset 2 (F(3,96)=35.6, p=1.5·10$^{-15}$). For both datasets, tasks with high cognitive load such as working memory or math were associated with nodes found relatively deep inside the core of the shape graphs, whereas resting state nodes were relatively more peripheral. FIGS. 5A-5B provide exemplary data showing that the exemplary data in FIGS. 4A-4B cannot be reproduced via null models that preserve linear properties of the data. Specifically, FIG. 5A illustrates that modularity-behavior correlations become insignificant, and FIG. 5B illustrates differences in core periphery structure are lost (F(3,168)=0.74, p=0.53). Additionally, the modularity-behavior correlations described above are largely stable to parameter perturbation. FIG. 6 provides exemplary data showing results from a grid search over a moderate region of parameter space surrounding the optimal parameter values for each dataset, and then computed modularity-behavior correlations across Datasets 1 and 2. Specifically, in FIG. 6, the axis labels (e.g., 31/37) correspond to the parameter values used for Dataset 1 and 2, respectively. The results were z-scored and combined to produce FIG. 6.

Figure 7:
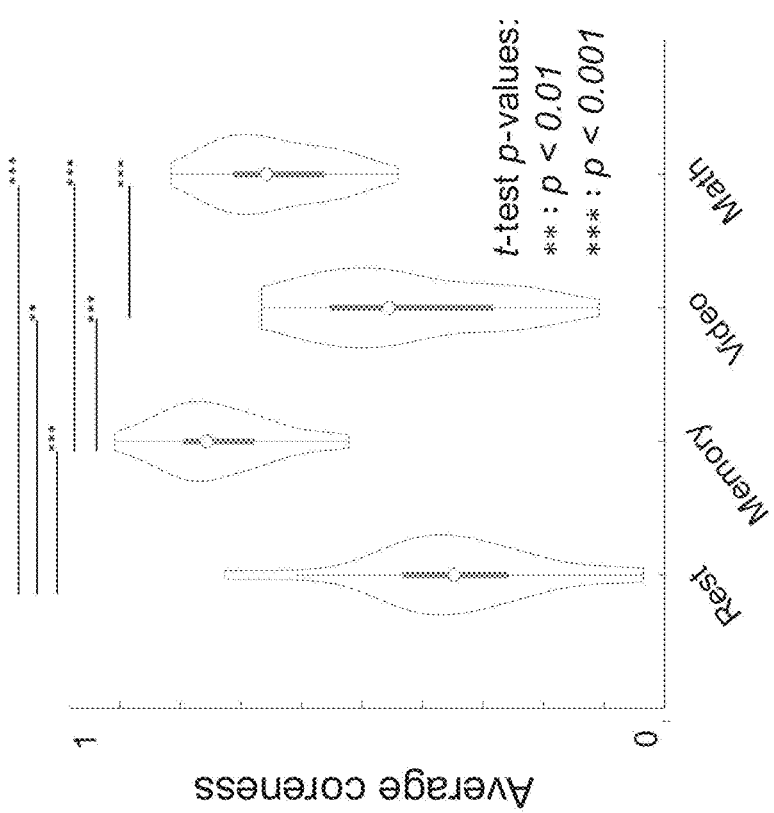
FIG. 7 provides exemplary results obtained by combining participants from independent datasets to show differences in core periphery structure are lost in accordance with various embodiments.

In the context of neural processes engaged during the CMP, core nodes could represent whole-brain configurations that consistently appear across a scan session, e.g., due to task-switching in a CMP or due to high-cognitive demands. Exemplary results obtained by combining participants from independent datasets (Datasets 1 and 2) are shown in FIG. 7. FIG. 4B shows the core-periphery structure for the individual datasets. Additionally, this core-periphery structure disappeared in the phase randomized null surrogates (FIGS. 5A-5B).

Figures 8A, 8B:
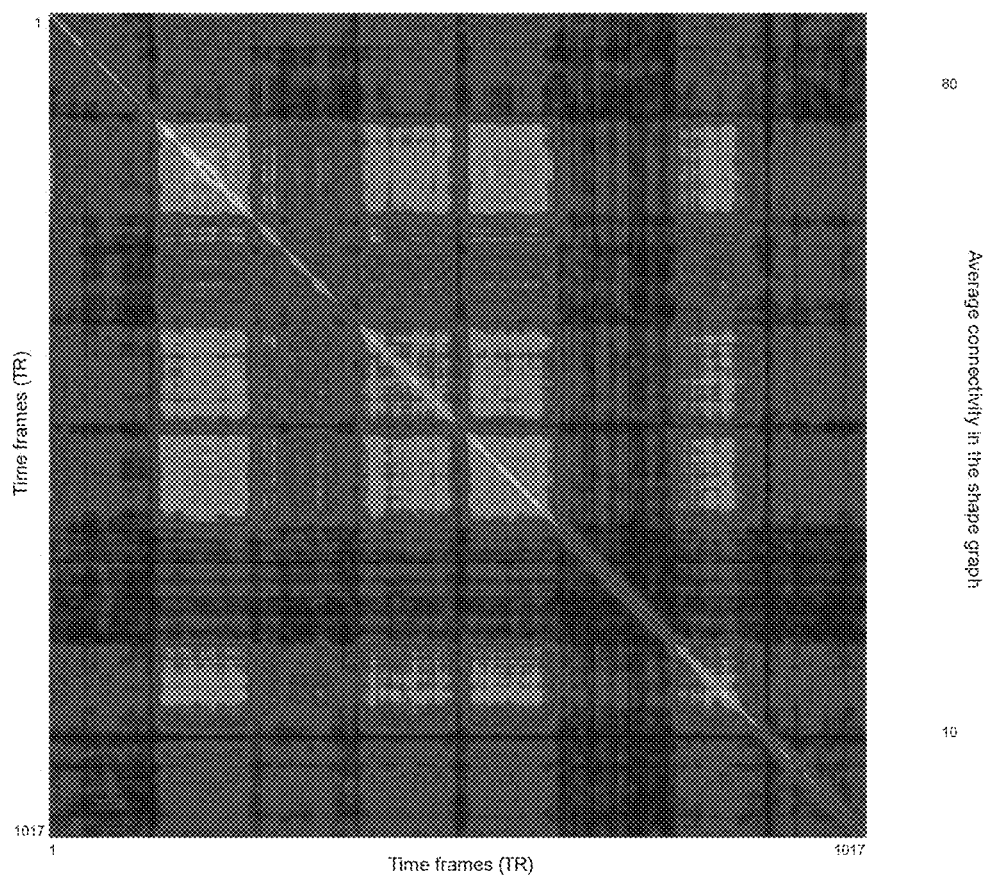
FIGS. 8A-8B provides exemplary data illustrating that shape graphs can reveal temporal transitions at the level of individual time frames in accordance with various embodiments.

Many embodiments also reveal transitions in task-evoked brain activity at the level of individual time frames. Given a shape graph, many embodiments construct a (#time frames×#time frames) temporal connectivity matrix (TCM) that shows how each time frame is connected (or similar) to all other time frames in the graph. Using the traditional Mapper approach on Dataset 1, a previous study found that time frames associated with tasks (e.g., working memory, video, math) typically had a higher degree of connectivity in the TCM, while those occurring between task blocks or during rest typically displayed a lower degree of connectivity. Further, that study found that the temporal evolution of the degree connectivity (i.e., of each time frame, across the entire scan) recovered the task-block structure (i.e., higher degrees evoked by and maintained during non-rest task blocks) and between-task transitions (i.e., lower degrees spanning the between-task instructional periods) of the CMP. FIGS. 8A-8B provides exemplary data reproducing these previous findings on the same Dataset 1 using an exemplary embodiment, NeuMapper. Specifically, FIGS. 8A-8B illustrate a temporal connectivity matrix (TCM) showing how individual time frames are connected in the shape graph, and the degree of nodes in the TCM can reveal task-evoked transitions in brain activity at the highest temporal resolution (i.e., individual time frames). And, FIG. 8A shows the average TCM across all 18 participants from Dataset 1, while FIG. 8B illustrates the average degree of nodes in the TCM across all 18 participants (solid line) recovers the task-block structure of the continuous multitask paradigm. Here we also show the degree of nodes in the TCM for individual participants. As expected, the temporal evolution of the group-averaged degree of connectivity visually recovers the task-block structure (i.e., higher degrees evoked by and maintained during non-rest task blocks) and between-task transitions (i.e., lower degrees spanning the between-task instructional periods) of the CMP at the highest temporal resolution (i.e., changes in degree occurring within a few time frames of the onset and offset of tasks). Further validating this new framework, these results suggest that shape graphs produced by NeuMapper can capture similar temporal properties of the data compared to those produced by the traditional Mapper approach.

While the two mesoscale properties of shape graphs present critical insights about neurobehavior, they can still be thought of as first-order insights. Thus, even though these mesoscale properties inform about how individual task blocks are represented on the graph—they miss any putative second-order structure, e.g., how well individual task blocks are separated from each other on the shape graphs. To better account for such second-order structures, numerous embodiments use tools from optimal transport theory. The pie-chart based proportional annotation of a shape graph node means that each task block contributes a fraction (possibly zero) of the time points making up the node. After normalizing, each task block thus yields a probability distribution over the nodes of the graph. Such embodiments compare the dissimilarities between these distributions using an optimal transport distance $d_{OT}$. Intuitively, task annotations correspond to different landforms making up the global landscape on which whole-brain dynamics occur during the CMP, and knowledge of pairwise distances between these landforms encodes the knowledge of the global structure of the landscape.

Anchoring Shape Graphs into Known Cognitive Constructs

Many embodiments are capable of identifying mental states in shape graphs. To do so, many embodiments can annotate notes using a database of mental states, such as the NeuroSynth decoding database, or a similar database. To do so, some embodiments annotate each node of the shape graph by the strength of spatial cross-correlation between the brain configuration represented by that node and configurations for related cognitive topics from the NeuroSynth database.

Figure 9A:
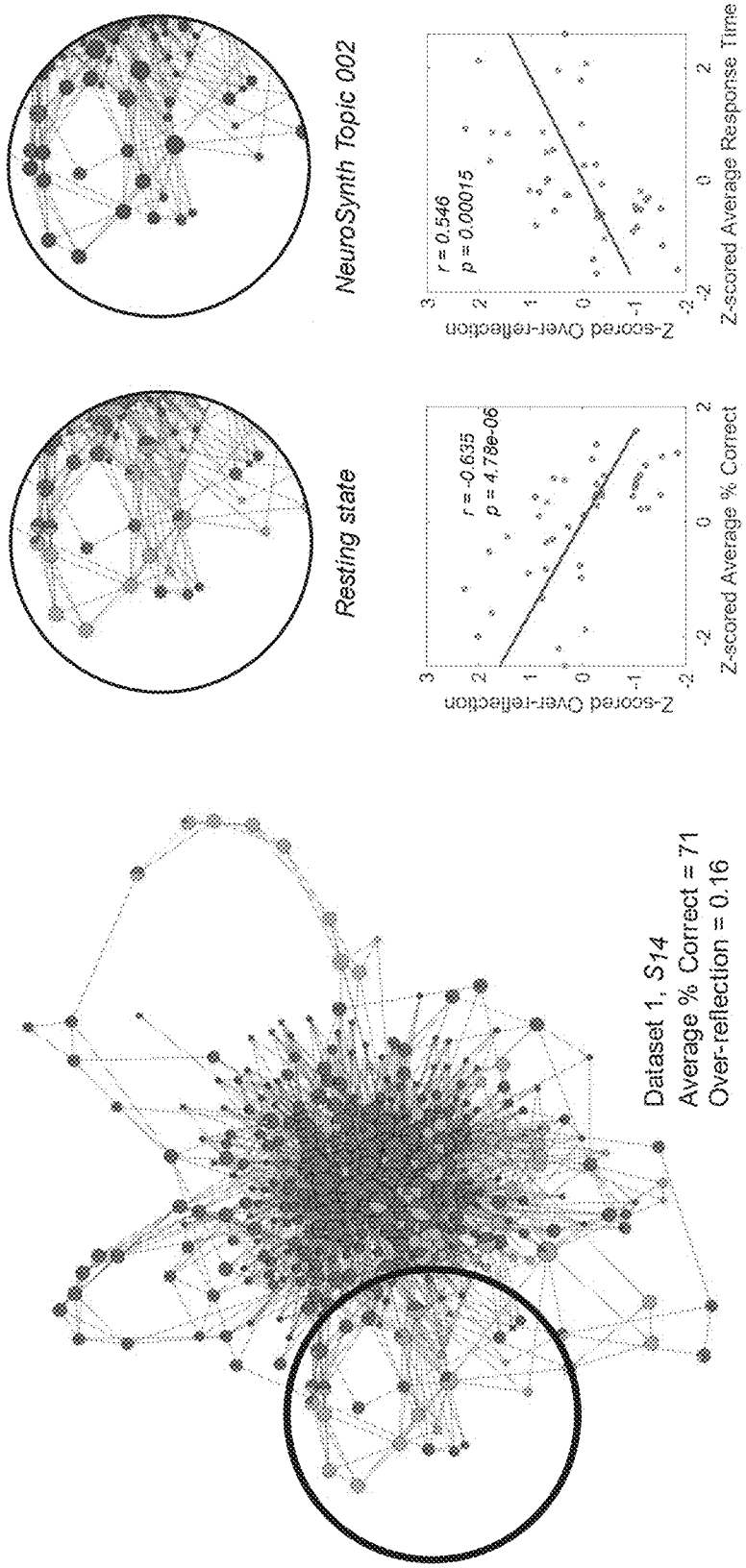
FIG. 9A provides exemplary data showing an over-reflection score in accordance with various embodiments.

FIG. 9A provides exemplary data showing an over-reflection score. Specifically that eliciting brain configurations that are more similar to the task-positive topic model during the expected resting state blocks (i.e., a mismatch) was significantly negatively correlated with the percentage of correct responses (averaged across tasks; $r=-0.635$, $p=4.78 \cdot 10^{-6}$) and significantly positively correlated with average response time (averaged across tasks; $r=0.546$, $p=0.00015$). These findings suggest that perhaps this negative relation is associated with putative over-reflection about tasks during periods of rest (i.e., when the participants are instructed to let their minds wander).

Figure 9B:
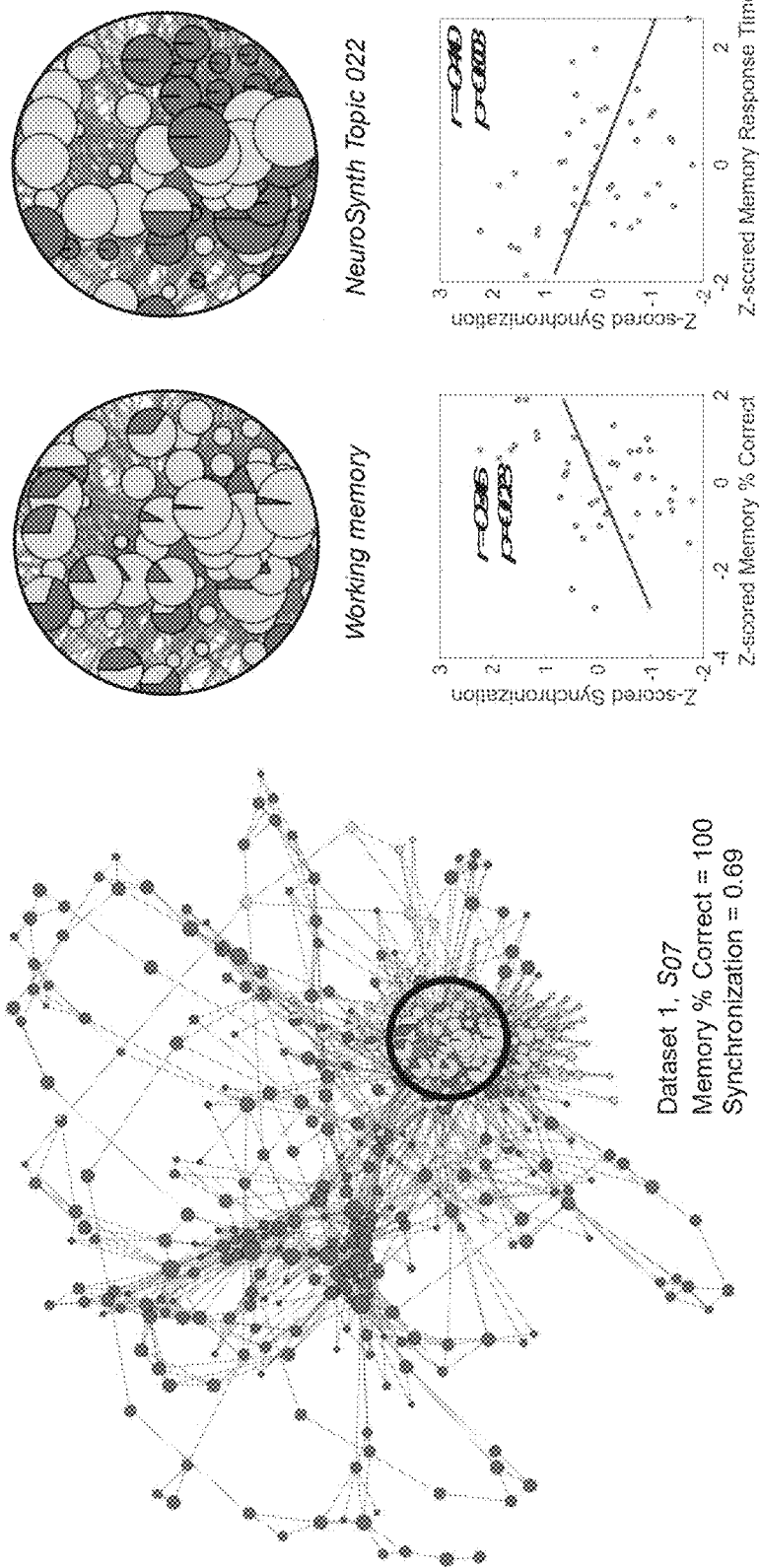
FIG. 9B provides exemplary data of a synchronization score in accordance with various embodiments.

FIG. 9B provides exemplary data of a synchronization score by counting the proportion of nodes where the empirical task-positive annotation coincided with the expected task (M, V, A) blocks and the task-negative annotation coincided with the expected rest (R) block. A significant correlation exists between the synchronization score and the average accuracy ($r=0.422$, $p=0.005$) and response time ($r=0.474$, $p=0.001$). To go further beyond the task-positive topic model, the embodiment was explored to see if specific topic models corresponding to the tasks (M, V, A) could be related to performance in each individual task. Specifically, using a specific topic model for the working memory task, an embodiment was explored to see if performance in the working memory blocks is associated with eliciting brain configurations that are more similar to the meta-analytic brain configurations generally related with working memory. Here, a higher match between empirical and expected task annotations was found—i.e., memory annotations predicted by NeuroSynth in nodes that were also annotated with the memory experimental task label—was significantly positively correlated with the percentage of correct responses for the memory task ($r=0.346$, $p=0.023$) and significantly negatively correlated with response time for the memory task ($r=-0.440$, $p=0.003$). In other words, this finding suggests that an individual's performance tends to increase when the participants duly engage the task-specific brain circuits while performing the task. This results also amplifies the putative role that embodiments can play in decoding mental states.

Benefits for Neurology and/or Psychiatry

Embodiments described herein provide a validated computational pipeline for neuroimaging data that can be easily used by researchers and clinicians for interactive data representation with simultaneous access to quantitative insights. Such embodiments provide novel algorithmic contributions as well as downstream processing techniques for capturing second-order mesoscale structure and meta-analysis guided inference. These computational methods can be translated into markers of individual differences in how the brain adapts to stimuli during ongoing cognition. In summary, we provide a validated computational pipeline for neuroimaging data that can be easily used by researchers and clinicians for interactive data representation with simultaneous access to quantitative insights.

Additionally, such embodiments are able to perform such determinations in a computationally efficient manner. As such, many embodiments are capable of being performed and/or stored remotely, such as on a mobile device, laptop, tablet, etc., rather than requiring large computational hardware and/or connection to such hardware (e.g., data connection to a computing core or server).

Figure 10:
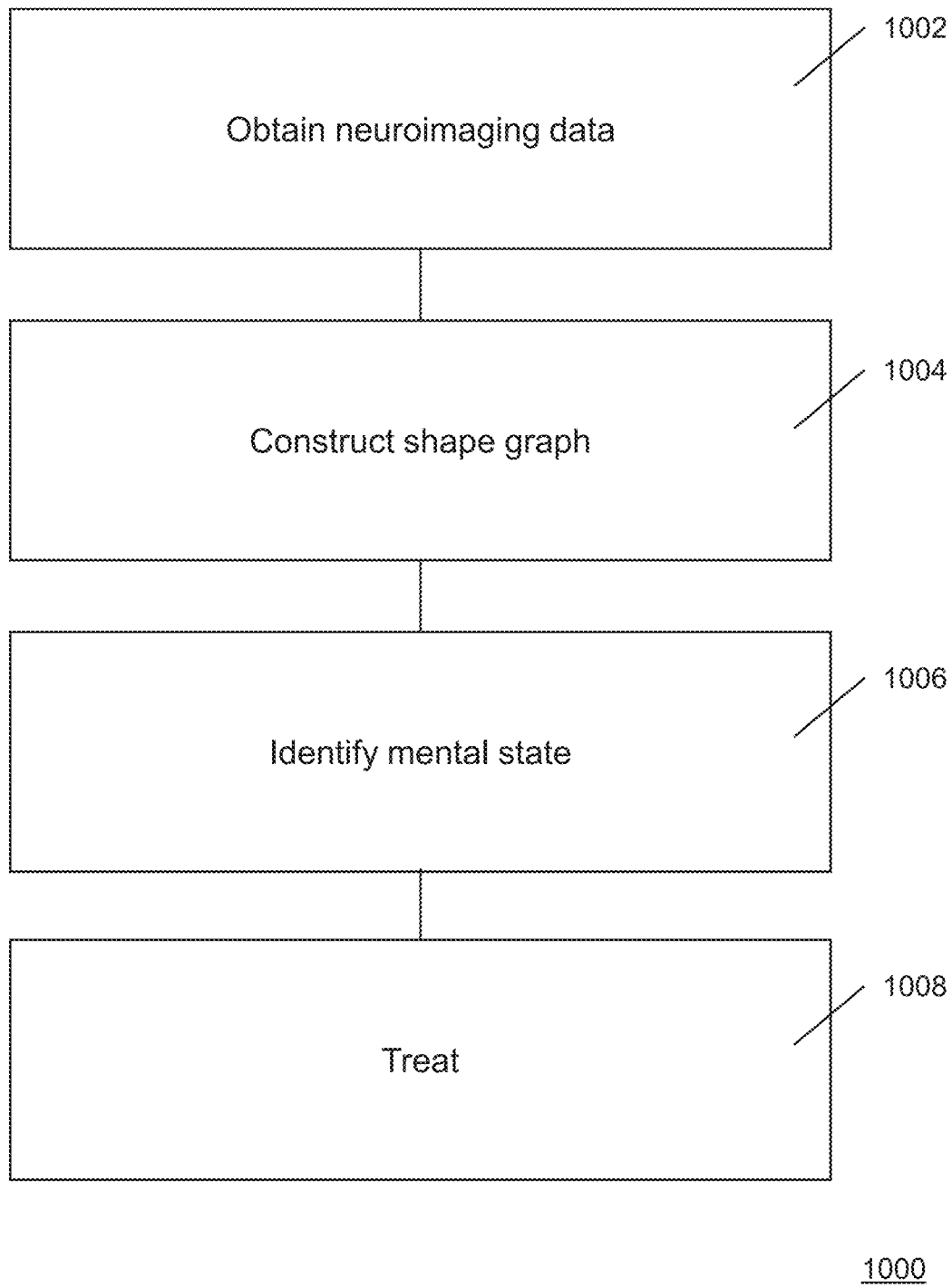
FIG. 10 illustrates an exemplary method to assess mental state in accordance with various embodiments.

Many embodiments are directed to methods to assess mental state from an individual based on shape graphs determined by methods described herein. Turning to FIG. 10, an exemplary method 1000 to assess mental state is provided. At 1002, many embodiments obtain neuroimaging data. In many embodiments, the neuroimaging data is obtained directly via imaging equipment, such as CT, MRI, fMRI, etc. In some embodiments, the neuroimaging data is obtained from a repository of neuroimaging data, such as neuroimaging data that was previously acquired and stored. Such a repository can be locally or remotely stored. In some embodiments, the neuroimaging data comprises scans of an individual accomplishing one or more specific tasks, such as resting, tasks involving working memory, tasks involving math or arithmetic, and/or tasks requiring focus.

At 1004, numerous embodiments construct a shape graph based on the neuroimaging data. Such methodologies and variants thereof are described herein.

Additional embodiments identify a mental state of the individual at 1006. Such mental states can be identified via comparison to a database of mental states and/or via machine learning models trained to identify a mental state from previously sampled data and mental states. In various embodiments, the mental states can be disease (or disorder) states, including psychological conditions, psychiatric conditions, and physical conditions (e.g., dementia).

Further embodiments can treat and/or prescribe a treatment for the individual, based on the mental state at 1008. Treatments can include pharmacological intervention (e.g., drugs, medicines, etc.) and/or rehabilitative, such as mental exercises, puzzles, etc., which can stimulate neural activity.

Computer Executed Embodiments

Figure 11:
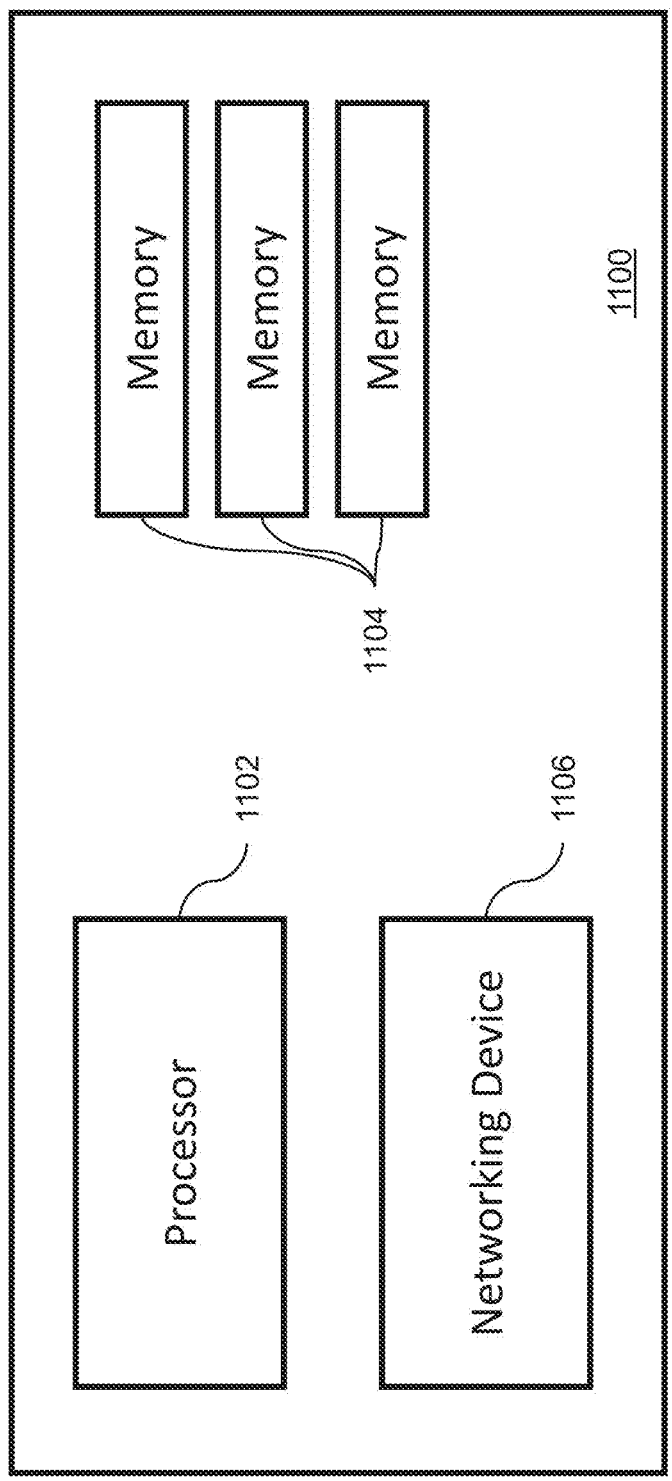
FIG. 11 illustrates a block diagram of components of a processing system in a computing device that can be used in accordance with various embodiments of the invention.

Processes that provide the methods and systems for determining image quality in accordance with some embodiments are executed by a computing device or computing system, such as a desktop computer, tablet, mobile device, laptop computer, notebook computer, server system, and/or any other device capable of performing one or more features, functions, methods, and/or steps as described herein. The relevant components in a computing device that can perform the processes in accordance with some embodiments are shown in FIG. 11. One skilled in the art will recognize that computing devices or systems may include other components that are omitted for brevity without departing from described embodiments. A computing device 1100 in accordance with such embodiments comprises a processor 1102 and at least one memory 1104. Memory 1104 can be a non-volatile memory and/or a volatile memory, and the processor 1102 is a processor, microprocessor, controller, or a combination of processors, microprocessor, and/or controllers that performs instructions stored in memory 1104. Such instructions stored in the memory 1104, when executed by the processor, can direct the processor, to perform one or more features, functions, methods, and/or steps as described herein. Any input information or data can be stored in the memory 1104—either the same memory or another memory. In accordance with various other embodiments, the computing device 1100 may have hardware and/or firmware that can include the instructions and/or perform these processes.

Certain embodiments can include a networking device 1106 to allow communication (wired, wireless, etc.) to another device, such as through a network, near-field communication, Bluetooth, infrared, radio frequency, and/or any other suitable communication system. Such systems can be beneficial for receiving data, information, or input (e.g., images, including neuroimaging) from another computing device and/or for transmitting data, information, or output (e.g., quality score, rating, etc.) to another device. In various embodiments, the networking device can be used to send and/or receive update models, interfaces, etc. to a user device.

Figure 12:
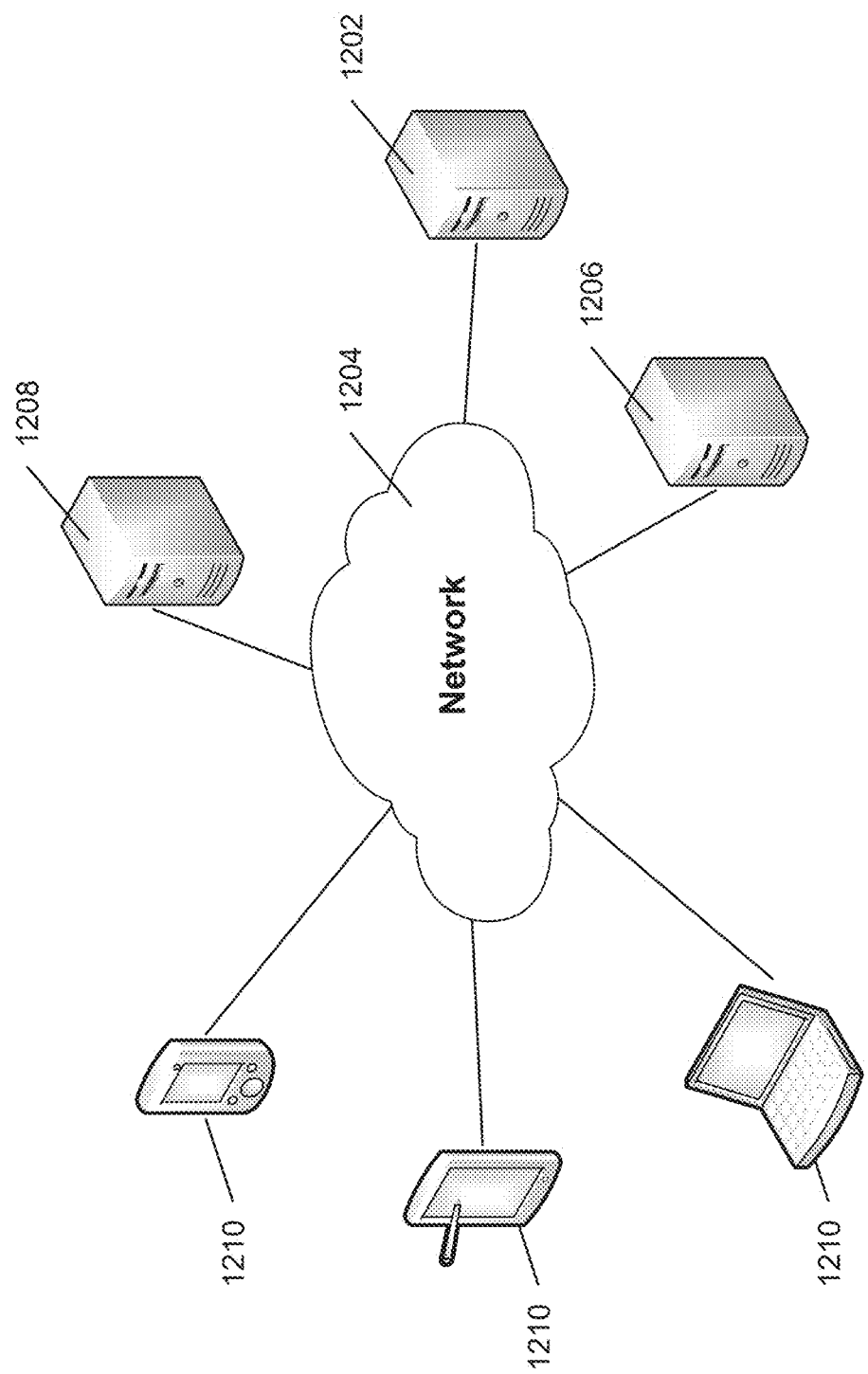
FIG. 12 illustrates a network diagram of a distributed system in accordance with various embodiments of the invention.

Turning to FIG. 12, an embodiment with distributed computing devices is illustrated. Such embodiments may be useful where computing power is not possible at a local level, and a central computing device (e.g., server) performs one or more features, functions, methods, and/or steps described herein. In such embodiments, a computing device 1202 (e.g., server) is connected to a network 1204 (wired and/or wireless), where it can receive inputs from one or more computing devices, including data from a records database or repository 1206, data provided from a laboratory computing device 1208, and/or any other relevant information from one or more other remote devices 1210. Once computing device 1202 performs one or more features, functions, methods, and/or steps described herein, any outputs can be transmitted to one or more computing devices 1206, 1208, 1210 for entering into records.

In accordance with still other embodiments, the instructions for the processes can be stored in any of a variety of non-transitory computer readable media appropriate to a specific application.

Doctrine of Equivalents

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

What is claimed is:

1. A method to identify mental state in an individual, comprising:
   obtaining neuroimaging data from an individual;
   constructing a shape graph of the neuroimaging data by:
   computing pairwise distances of each data point in a data matrix, D, of the neuroimaging data;
   constructing a reciprocal k-nearest neighbors (kNN) graph based on the pairwise distances;
   determining geodesic distances based on the kNN graph;
   landmarking the geodesic distances using farthest point sampling to generate landmarks on the neuroimaging data;
   binning data within the neuroimaging data into bins based on the geodesic distances between data points in the neuroimaging data by partitioning the data into r overlapping bins, where partitioning the data comprises: for each landmark, defining $$B_i := \left\{ x : D'(x_i, x) \le 4 \in \cdot \frac{g}{100} \right\},$$

where $B_i$ is a bin for a first landmark $x_i$, x is a second landmark, D' is a transformed matrix produced from data matrix D, where D' approximates a geometry of temporal trajectories through brain activity space in the neuroimaging data, and g is a gain parameter that controls a level of overlap between each bin; and
   clustering the bins; and
   identifying a mental state of the individual based on the shape graph.

2. The method of claim 1, wherein binning data comprises intrinsic binning or extrinsic binning, wherein intrinsic binning uses landmarks and intrinsic metrics of the data points, and extrinsic binning uses a d-dimensional grid with overlapping cells that fully covers a d-dimensional projection.

3. The method of claim 1, wherein the neuroimaging data is obtained from a CT scan, an MRI scan, an fMRI scan, or combinations thereof.

4. A system for identifying mental state in an individual, comprising:
   a processor and a memory, wherein the memory contains instructions that when executed by the processor instructs the processor to:
   obtain neuroimaging data from an individual;
   construct a shape graph of the neuroimaging data, where to construct the shape graph, the processor is further instructed to:
   compute pairwise distances of each data point in a data matrix, D, of the neuroimaging data;
   construct a reciprocal k-nearest neighbors (kNN) graph based on the pairwise distances;
   determine geodesic distances based on the kNN graph;
   landmark the geodesic distances using farthest point sampling to generate landmarks on the neuroimaging data;
   bin data within the neuroimaging data based on the geodesic distances between data points in the neuroimaging data by partitioning the data within the neuroimaging data into r overlapping bins, where partitioning the data comprises: for each landmark, defining $$B_i := \left\{ x : D'(x_i, x) \le 4 \in \cdot \frac{g}{100} \right\},$$

where $B_i$ is a bin for a first landmark $x_i$, x is a second landmark, D' is a transformed matrix produced from data matrix D, where D' approximates a geometry of temporal trajectories through brain activity space in the neuroimaging data, and g is a gain parameter that controls a level of overlap between each bin; and
   cluster the bins; and
   identify a mental state of the individual based on the shape graph.

5. The system of claim 4, wherein binning data comprises intrinsic binning or extrinsic binning, wherein intrinsic binning uses landmarks and intrinsic metrics of the data points, and extrinsic binning uses a d-dimensional grid with overlapping cells that fully covers a d-dimensional projection.

\* \* \* \* \*